(12) United States Patent
Shim

(10) Patent No.: US 6,876,630 B1
(45) Date of Patent: Apr. 5, 2005

(54) REFRAMER AND LOSS OF FRAME (LOF) CHECK APPARATUS FOR DIGITAL HIERARCHY SIGNAL

(75) Inventor: Dae-Hyuk Shim, Kunpo-shi (KR)

(73) Assignee: LG Information & Communications, Ltd., Seoul (KR)

(*) Notice: Subject to any disclaimer, the term of this patent is extended or adjusted under 35 U.S.C. 154(b) by 0 days.

(21) Appl. No.: 09/470,982

(22) Filed: Dec. 23, 1999

(30) Foreign Application Priority Data

Dec. 31, 1998 (KR) ............................................ 98-63775
Aug. 3, 1999 (KR) ........................................ 1999-31816

(51) Int. Cl.[7] ............................. H04L 12/26; H04J 3/06
(52) U.S. Cl. ..................................... 370/242; 370/503
(58) Field of Search ................................ 370/242, 249, 370/368, 389, 472, 474, 503, 510, 517, 522, 514, 509, 513, 252, 400, 452, 402, 392, 395.1; 375/368, 292, 132, 134; 704/226, 233; 710/107

(56) References Cited

U.S. PATENT DOCUMENTS

| | | | |
|---|---|---|---|
| 3,928,726 A | * 12/1975 | Colton et al. ............... | 370/517 |
| 3,985,967 A | * 10/1976 | Colton et al. ............... | 370/510 |
| 4,016,368 A | * 4/1977 | Apple, Jr. ................... | 370/510 |
| 4,368,512 A | * 1/1983 | Kyu et al. ................... | 710/107 |
| 4,638,477 A | * 1/1987 | Okada et al. ............... | 370/400 |
| 5,200,979 A | * 4/1993 | Harris ........................ | 375/292 |
| 5,400,369 A | * 3/1995 | Ikemura .................... | 370/510 |
| 5,528,579 A | * 6/1996 | Wadman et al. ............ | 370/472 |
| 5,557,614 A | * 9/1996 | Sandler et al. .............. | 370/509 |
| 5,671,227 A | * 9/1997 | Keller et al. ................ | 370/509 |
| 5,710,774 A | * 1/1998 | Suh et al. ................... | 370/513 |
| 5,875,217 A | 2/1999 | Hartmann et al. .......... | 375/372 |
| 5,978,761 A | * 11/1999 | Johansson ................... | 704/233 |
| 5,982,762 A | * 11/1999 | Anzai et al. ................ | 370/338 |
| 6,031,863 A | * 2/2000 | Jusa et al. ................... | 370/350 |
| 6,266,327 B1 | * 7/2001 | Hernandez-Valencia .... | 370/252 |
| 6,400,715 B1 | * 6/2002 | Beaudoin et al. ........... | 370/392 |
| 6,442,163 B1 | * 8/2002 | Chopping ................... | 370/395.1 |

* cited by examiner

*Primary Examiner*—Duc Ho
*Assistant Examiner*—Phuongchau Ba Nguyen
(74) *Attorney, Agent, or Firm*—Fleshner & Kim, LLP

(57) ABSTRACT

A reframer and Loss Of Frame (LOF) checking apparatus excludes an input frame data having an improper start point, carries out a reframing process, checks whether the reframed data is normal, and outputs a LOF state to a checking board or operator, in accordance with a predetermined Frame Alignment Signal (FAS) of a digital hierarchy structure. The reframer and Loss Of Frame (LOF) checking apparatus includes frame filtering and realigning units for detecting a frame start point of input frame data by using the FAS, excluding input data having an improper start point that is caused by a frame data loss, by using the frame start point detecting value, and outputting reframed data having a normal frame format. The apparatus also includes LOF declaring and releasing units for re-detecting the FAS in the reframed data, checking whether the reframed data is normal, setting a frame loss or loss releasing state indicator, according to the checking result, and outputting each state indicator signal.

32 Claims, 16 Drawing Sheets

FIG. 1A

| | 1 | 2 | 3 | 4 | 5 | 6 | 7 | 8 | 9 | 12 13 14 15 16 17 | | 488 |
|---|---|---|---|---|---|---|---|---|---|---|---|---|
| | $C_{11}$ | $C_{21}$ | $C_{31}$ | $C_{41}$ | \multicolumn{5}{c|}{FRAME ALIGNMENT SIGNAL 1111010000} | AIS | Z | TRIBUTARY INFORMATION |
| | $C_{12}$ | $C_{22}$ | $C_{32}$ | $C_{42}$ | \multicolumn{5}{c|}{TRIBUTARY INFORMATION} | | | |
| | $C_{13}$ | $C_{23}$ | $C_{33}$ | $C_{43}$ | \multicolumn{5}{c|}{TRIBUTARY INFORMATION} | | | |
| | $C_{14}$ | $C_{24}$ | $C_{34}$ | $C_{44}$ | \multicolumn{5}{c|}{TRIBUTARY INFORMATION} | | | |
| | $C_{15}$ | $C_{25}$ | $C_{35}$ | $C_{45}$ | $S_1$ | $S_2$ | $S_3$ | $S_4$ | \multicolumn{4}{c|}{TRIBUTARY INFORMATION} |

488 BITS

DETECT START POINT

FA(Hex)= 11111010(binary)

FIG. 3B

| PARALLEL OUTPUT DATA (B9) | 1 PERIOD | 2 PERIOD | 3 PERIOD |
|---|---|---|---|
| a[7:0] | 11101100 | 00101011 | 10110011 |
| b[7:0] | 00110010 | . | . |
| c[7:0] | 01010101 | . | . |
| d[7:0] | 10101010 | . | . |
| e[7:0] | 00001111 | . | . |
| f[7:0] | 10100000 | . | . |
| g[7:0] | 00000000 | . | . |
| h[7:0] | 01100101 | . | . |
| i[7:0] | 00101011 | 10110011 | . |

FIG. 4

| INPUT BIT SEQUENCE | FAS DETECTION | DETEC[7:0] | INIT[2:0] | CNT_ENA | OUTPUT OF COUNTER (140) [2:0] |
|---|---|---|---|---|---|
| G1 | HIGH | 10000000 | 000 | HIGH | 000, 001, 010, 011, 100, 101, 110, 111, 000,... |
| G2 | HIGH | 01000000 | 001 | HIGH | 001, 010, 011, 100, 101, 110, 111, 000, 001,... |
| G3 | HIGH | 00100000 | 010 | HIGH | 010, 011, 100, 101, 110, 111, 000, 001, 010,... |
| G4 | HIGH | 00010000 | 011 | HIGH | 011, 100, 101, 110, 111, 000, 001, 010, 011,... |
| G5 | HIGH | 00001000 | 100 | HIGH | 100, 101, 110, 111, 000, 001, 010, 011, 100,... |
| G6 | HIGH | 00000100 | 101 | HIGH | 101, 110, 111, 000, 001, 010, 011, 100, 101,... |
| G7 | HIGH | 00000010 | 110 | HIGH | 110, 111, 000, 001, 010, 011, 100, 101, 110,... |
| G8 | HIGH | 00000001 | 111 | HIGH | 111, 000, 001, 010, 011, 100, 101, 110, 111,... |

REFRAMER AND LOSS OF FRAME (LOF) CHECK APPARATUS FOR DIGITAL HIERARCHY SIGNAL

BACKGROUND OF THE INVENTION

1. Field of the Invention

The present invention relates to a digital hierarchy transmission system, and more particularly to a reframer and a Loss Of Frame(LOF) check apparatus.

2. Background of the Related Art

There are several digital hierarchy standards, such as, North American, European, and Japanese hierarchies, in the current communication network. A digital hierarchy includes Digital Signal(DS)-1~DS-4 hierarchy signals of the North American standard and of the European standard defined by the International Telecommunication Union-Telecommunication Sector ITU-T and the Bell system. Two digital hierarchies are called Plesiochronous Digital Hierarchy (PDH) and Synchronous Digital Hierarchy (SDH).

The North American type PDH includes DS-1(1.544 Mbps), DS-1C(3.152 Mbps), DS-2(6.312 Mbps), DS-3 (44.736 Mbps), DS-4(274.176 Mbps), etc. The European type PDH includes DS-1E (2.048 Mbps), DS-2E (8.448 Mbps), DS-3E (34.368 Mbps), DS-4E (139.264 Mbps), DS-5E (564.992 Mbps), etc.

The SDH is a Network Node Interface (NNI) standard which is capable of establishing an international communication network by connecting North American type hierarchies and European type hierarchies together. The SDH may be used in the Synchronous Optical Network (SONET) connecting standard for the North American hierarchy, but a basic transmission rate or a frame type is not similar between the hierarchies.

A SDH transmission system provides multiplexing/demultiplexing for mapping digital hierarchy signals, such as DS-1~DS-4 and DS1E~DS4E to/from a STM-n signal. The transmission system transmits information by frames having a constant period.

Transmission apparatuses using the SDH are very efficient in network management and providing convenient functions for supervising transmission failures such as bit error failures. A standardization to one communication protocol level in the SDH allows for compatibility with other providers without losing efficiency.

As shown in FIG. 1A, a DS-4E frame in a PDH structure has 488*6 bits (or 61*6 bytes) for a total of 2928 bits (or 366 bytes), according to ITU-T recommendations. The DS-4E (E4) frame includes a 12 bit-Frame Alignment Signal (FAS) for identifying a frame start point, and a Remote Defect Indication (RDI) bit following the FAS. An alarm state is identified when the 12 bit FAS is "111110100000" and the following RDI bit is "1". The DS-4E frame also includes position fitting bits C and S, a national identification Z, and tributary information bits.

A sending party inserts a FAS to each frame and sends the frames to a receiving party, that detects the FAS and identifies a frame start point. The receiving party also processes data signals by checking a pulse sequence received at every frame.

However, the data signal, which is incoming to the receiving party during a power on/off or a reset, may have an improper frame start point. Data errors can readily occur over many frames if improper start points are generated during power on/off or reset. In order to prevent the processing of improper data, an apparatus is needed for improving stabilization of the overall system and for processing normal data by detecting data errors in the frame.

SUMMARY OF THE INVENTION

An object of the present invention is to at least substantially obviate one or more of the problems due to limitations and disadvantages of the related art, and provide at least the advantages set forth below.

Another object of the present invention is to provide a reframer of a digital hierarchy signal.

Another object of the present invention is to provide a reframer absent of a frame data having an improper start point.

Another object of the present invention is to provide a loss of frame (LOF) checking apparatus.

Another object of the present invention is to check whether reframed data is normal.

Another object of the present invention is to forward a LOF state to a checking unit or operator.

Another object of the present invention is to provide a chip that carries out a reframing process.

Another object of the present invention is to select and/or output the serial or parallel reframed data.

The objects of the present invention may be achieved, as a whole or in parts, by a reframer including frame filtering and realigning units that detect a frame start point of input data, by using a Frame Alignment Signal (FAS) defined in a framed data of a digital hierarchy structure, and that excludes the input data having an improper start point by using a frame start point detecting value (DETEC), and that outputs reframed data having a normal frame format.

The objects of the present invention can also be achieved, as a whole or in parts, by a checking apparatus having a digital hierarchy structure, and including a first section that detects a frame alignment signal in a framed data of a digital hierarchy signal, and a second section that checks whether the framed data is normal, and provides a releasing state according to the checking result.

The objects of the present invention can further be achieved, as a whole or in parts, by a checking apparatus having a digital hierarchy structure, including frame filtering and realigning devices for detecting a frame start point of input data by using a Frame Alignment Signal (FAS) defined in a data frame, excluding input data having an improper start point caused by data loss by using the frame start point detecting value, and outputting reframed data having a normal frame format; and LOF declaring and releasing devices for re-detecting the FAS in a reframed data of a digital hierarchy signal, checking whether the reframed data is normal, setting a frame loss or loss releasing state according to the checking result respectively, and then outputting each setting state indication signal.

The objects of the present invention, can further be achieved, as a whole or in parts, by a reframer including a frame filtering and realigning unit for detecting a frame start point of input data by using Frame Alignment Signal FAS defined in a frame data of digital hierarchy signal, excluding input data having an improper start point caused by frame data loss by using a frame start point detecting value DETEC, and outputting reframed data having a normal frame format.

The objects of the present invention, can further be achieved, as a whole or in parts, by a reframer, wherein the frame filtering and realigning unit comprises an input selecting unit for shifting the frame data having the digital hierarchy structure, received from transmission networks sequentially according to a designated clock signal, selecting frame data on a byte by byte basis for checking the FAS, mapping respective bits of the selected frame data sequentially, and then selecting FAS checking pattern on a bit by bit basis, a frame start point detecting unit for receiving the FAS checking pattern outputted from the input selecting unit, and detecting the frame start point which designates a start location of the FAS, an initial value setting unit for setting a counter initial value for counting improper frame data depending on the frame start point detecting value DETEC, and generating a control signal for driving a corresponding counter, a counting unit for counting the number of bits having improper data among frame data, from the frame start point by counting according to the control signal and the initial value, and a frame aligning unit for realigning the input data according to the frame start point detecting value DETEC and a result of the counting unit, and then outputting reframed data having only a proper start point.

The objects of the present invention, can further be achieved, as a whole or in parts, by a reframer, wherein the input selecting unit comprises a shifting unit for shifting the frame data having the digital hierarchy structure incoming on basis of constant byte(N) unit, by using a constant bit counter and shift register and then outputting parallel data (N+1) sequentially, and a checking pattern mapping unit for mapping upper data(N) among the parallel data(N+1) from an upper bit in order, and forming the FAS checking pattern having the same length as the FAS bit length.

The objects of the present invention, can further be achieved, as a whole or in parts, by a reframer, wherein the checking pattern mapping unit comprises a byte shifting unit for receiving the frame data having the digital hierarchy structure on basis of the constant byte(N) unit, shifting the input data according to a designated clock signal by using a constant bit counter, and outputting N byte data in parallel, sequentially, a bit grouping unit for mapping an output of the byte shifting unit at every constant bit according to a designated rule, and outputting a plurality of checking patterns formed by grouped at each bit unit, and a checking pattern selecting output unit for outputting a plurality of the checking patterns outputted from the bit grouping unit at every checking period, selectively.

The objects of the present invention, can further be achieved, as a whole or in parts, by a reframer, wherein the checking pattern mapping unit sets (N+1)th data among the parallel data as an upper first data of a next period and maps upper N data from the first data in the next period sequentially.

The objects of the present invention, can further be achieved, as a whole or in parts, by a reframer, wherein the frame start point detecting unit receives the checking pattern of the input selecting unit, carries out a start point detecting operation repeatedly until detecting a defined frame alignment signal FAS, and determines the frame start point detecting value DETEC according to an input data bit order, in order to indicate the FAS start bit after detecting the FAS.

The objects of the present invention, can further be achieved, as a whole or in parts, by a reframer, wherein the frame start point detecting value DETEC is continuously maintained after detecting the FAS, until a reset signal is inputted or a power source is off.

The objects of the present invention, can further be achieved, as a whole or in parts, by a reframer, wherein the frame aligning unit finds a frame start bit among input data by the frame start point detecting value DETEC and excludes data bits having an improper start point among the inputted parallel data according to the counting result.

The objects of the present invention, can further be achieved, as a whole or in parts, by a reframer, wherein the reframer is positioned on a signal chip and arranges a plurality of the frame filtering and realigning units in parallel on a plurality of multi-channels(N), multiplied by extending the frame data of the digital hierarchical structure n times, thereby processing Synchronous Transfer Mode (STM)-n signal having a plurality of the multi-channels.

The objects of the present invention, can further be achieved, as a whole or in parts, by a reframer, further including a serial/parallel converting and input selecting unit for converting serial input data transmitted from a transmission network to parallel data and for outputting one between the converted parallel data and the frame data of the digital hierarchy signal, selectively, and a parallel/serial converting and output selecting unit for converting reframed parallel data to serial data and for outputting one between the converted serial data and the reframed parallel data, selectively.

The objects of the present invention, can further be achieved, as a whole or in parts, by a Loss Of Frame (LOF) checking apparatus, including a LOF declaring and releasing unit for re-detecting the Frame Alignment Signal (FAS) in a reframed data of a digital hierarchy signal, checking whether the reframed data is normal, setting a frame loss or loss releasing state according to the checking result respectively, and then outputting each setting state indication signal.

The objects of the present invention, can further be achieved, as a whole or in parts, by a Loss Of Frame (LOF) checking apparatus, wherein the LOF declaring and releasing unit comprises a FAS detecting unit for checking first constant bits inputted on a frame start pulse location of the reframed data, generating and outputting a LOF releasing enable signal or a LOF declaring enable signal depending that the first constant bits are bits of the FAS, a LOF declaring unit for checking the first constant bits inputted on the frame start pulse location of the reframed data by the LOF declaring enable signal, in the LOF releasing state, and outputting a LOF declaring signal in case that the first constant bits of the reframed data which are different from the first constant bits of the FAS, are inputted over constant frames continuously, a LOF releasing unit for checking the first constant bits inputted on the frame start pulse location of the reframed data by the LOF releasing enable signal, in the LOF declaring state, and outputting a LOF releasing signal in case that the first constant bits of the reframed data which are same as the first constant bits of the FAS, are continuously inputted over constant frames, and a LOF determining unit for receiving the LOF declaring signal and the LOF releasing signal, and outputting a LOF state signal for indicating a last LOF state of the incoming reframe data.

The objects of the present invention, can further be achieved, as a whole or in parts, by a Loss Of Frame (LOF) checking apparatus, wherein the LOF declaring unit comprises a sub-frame counter for counting a sub-frame length (column length) of a unit frame according to a designated clock signal, a frame start pulse generating unit for counting the number of the sub-frames (frame row length) by incoming a column count result of the sub-frame counter, and generating and providing a frame start pulse signal to the FAS detecting unit at every frame by logical-operating bit values of a column count result and a row count result, a first counting unit for receiving the reframed data, the frame count result and the LOF releasing signal of the LOF releasing unit, the LOF declaring enable signal of the FAS detecting unit, the count result of the column counter, and the count result of the frame start pulse generating unit, checking whether the count result, same as the first constant bits of the FAS, is continuously inputted over constant frames on the frame start pulse location of the reframed data, and a first output unit for generating and outputting the LOF declaring signal according to the count result of the first counting unit.

The objects of the present invention, can further be achieved, as a whole or in parts, by a Loss Of Frame (LOF) checking apparatus, wherein the LOF declaring signal maintains a LOF declaring value in the LOF releasing state, in case that the first constant bit value of the FAS is inputted abnormally over constant frames on the frame start pulse location of the reframed data, and maintains a normal frame declaring value in case that the first constant bit of the FAS is inputted normally before FAS incomes over constant frame continuously.

The objects of the present invention, can further be achieved, as a whole or in parts, by a Loss Of Frame (LOF) checking apparatus having digital hierarchy structure, wherein the LOF releasing unit comprises a second counting unit for receiving the reframed data, a LOF releasing enable signal of the FAS detecting unit, and the count result and the LOF declaring signal of the LOF declaring unit, and checking whether the first constant bits incoming on the frame start pulse location of the reframed data same as the first constant bits of the FAS, is continuously inputted for over constant frames on the frame start pulse location of the reframed data in the LOF declaring state, and a second output unit for outputting a LOF releasing signal according to the count result of the second counting unit.

The objects of the present invention, can further be achieved, as a whole or in parts, a Loss Of Frame (LOF) checking apparatus, wherein the LOF releasing signal maintains a LOF releasing value in the LOF declaring state, in case that the first constant bit of the FAS is inputted abnormally over constant frame on the frame start pulse location of the reframed data, and maintains a LOF value in case that the first constant bit of the FAS is continuously inputted abnormally before FAS incomes over constant frame.

The objects of the present invention, can further be achieved, as a whole or in parts, by a reframer and Loss Of Frame (LOF) checking apparatus, including a frame filtering and realigning unit for detecting a frame start point of input data by using Frame Alignment Signal (FAS) defined in a frame data of digital hierarchy signal, excluding input data having an improper start point caused by frame data Loss by using the frame start point detecting value, and outputting reframed data having a normal frame format, and a LOF declaring and releasing unit for re-detecting FAS in a reframed data of a digital hierarchy signal, checking whether the reframed data is normal, setting a frame Loss or Loss releasing state according to the checking result respectively, and then outputting each setting state indication signal.

The objects of the present invention, can further be achieved, as a whole or in parts, by a reframer and Loss Of Frame (LOF) checking apparatus, wherein the frame filtering and realigning unit comprises an input selecting unit for shifting the frame data having the digital hierarchy structure, received from transmission networks sequentially according to a designated clock signal, selecting frame data on a byte by byte basis for checking the FAS, mapping respective bits of the selected frame data sequentially, and then selecting a FAS checking pattern on a bit by bit basis, a frame start point detecting unit for receiving the FAS checking pattern outputted from the input selecting unit, and detecting the frame start point which designates a start location of the FAS, an initial value setting unit for setting a counter initial value for counting improper frame data depending on the frame start point detecting value DETEC, and generating a control signal for driving a corresponding counter, a counting unit for counting the number of bits having improper data among frame data, from the frame start point by counting according to the control signal and the initial value, and a frame aligning unit for realigning the input data according to the frame start point detecting value DETEC and a result of the counting unit, and then outputting reframed data having only proper start point.

The objects of the present invention, can further be achieved, as a whole or in parts, by a reframer and Loss Of Frame (LOF) checking apparatus, wherein the reframer constituted on a signal chip arranges a plurality of the frame filtering and realigning units in parallel on a plurality of multi-channels (N), multiplied by extending the frame data of the digital hierarchical structure n times, and connects a plurality of the LOF declaring and releasing units to the frame filtering and realigning unit respectively, thereby processing Synchronous Transfer Mode (STM)-n signal having a plurality of the multi-channels and carrying out the LOF checking simultaneously.

The objects of the present invention, can further be achieved, as a whole or in parts, by a reframer and Loss Of Frame (LOF) checking apparatus, wherein the LOF declaring and releasing unit comprises a FAS detecting unit for checking first constant bits inputted on a frame start pulse location of the reframed data, generating and outputting a LOF releasing enable signal or a LOF declaring enable signal depending that the first constant bits are bits of the FAS, a LOF declaring unit for checking the first constant bits inputted on the frame start pulse location of the reframed data by the LOF declaring enable signal, in the LOF releasing state, and outputting a LOF declaring signal in case that the first constant bits of the reframed data which are different from the first constant bits of the FAS, are inputted over constant frames continuously, a LOF releasing unit for checking the first constant bits inputted on the frame start pulse location of the reframed data by the LOF releasing enable signal, in the LOF declaring state, and outputting a LOF releasing signal in case that the first constant bits of the reframed data which are same as the first constant bits of the FAS, are continuously inputted over constant frames, and a LOF determining unit for receiving the LOF declaring signal and the LOF releasing signal, and outputting a LOF state signal for indicating a last LOF state of the incoming reframe data.

The objects of the present invention, can further be achieved, as a whole or in parts, by a reframer and Loss Of Frame (LOF) checking apparatus, including a serial/parallel converting and input selecting unit for converting serial input data transmitted from a transmission network to parallel data and for outputting one between the converted parallel data and the frame data of the digital hierarchy signal, selectively, and a parallel/serial converting and output selecting unit for converting reframed parallel data to serial data and for outputting one between the converted serial data and the reframed parallel data, selectively.

The objects of the present invention, can further be achieved, as a whole or in parts, by a reframer, comprising a first circuit that detects a frame start point of input data based on a frame alignment signal defined in a framed data of a digital hierarchy signal, and a second circuit that excludes the input data having an improper start point based on a frame start point detecting value, and that outputs reframed data having a normal frame format.

The objects of the present invention, can further be achieved, as a whole or in parts, by an apparatus for checking a loss of frame, comprising a first circuit that detects a frame alignment signal in a framed data of a digital hierarchy signal, and a second circuit that checks whether the framed data is normal, and provides a releasing state according to the checking result.

The objects of the present invention, can further be achieved, as a whole or in parts, by an integrated circuit for a digital communication, comprising a reframer, including a first circuit that detects a frame start point of input data based on a frame alignment signal defined in a framed data of a digital hierarchy signal, and a second circuit that excludes the input data having an improper start point based on a framed start point detecting value, and that outputs reframed data having the frame alignment signal; and a loss of frame checking apparatus coupled to the reframer, wherein the loss of frame checking apparatus includes a third circuit that detects the frame alignment signal in the reframed data, and a fourth circuit that checks whether the reframed data has a normal frame format, and provides a releasing state according to the checking result.

The objects of the present invention, can further be achieved, as a whole or in parts, by an integrated circuit for digital communication, comprising a plurality of reframers on a signal chip, wherein each reframer comprises a first circuit that detects a frame start point of input data based on a frame alignment signal defined in a framed data of a digital hierarchy signal, and a second circuit that excludes the input data having an improper start point based on a frame start point detecting value, and that outputs reframed data having a normal frame format.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein:

FIG. 1A shows a DS-4E (E4) frame format according to ITU-T recommendations;

FIG. 3B shows a table of output data based on the input data shown in FIG. 3A;

FIG. 4 shows a table indicating the output data from the frame start point detecting unit, the initial value setting unit, and the counter shown in FIG. 2;

DETAILED DESCRIPTION OF PREFERRED EMBODIMENTS

Figure 1B:
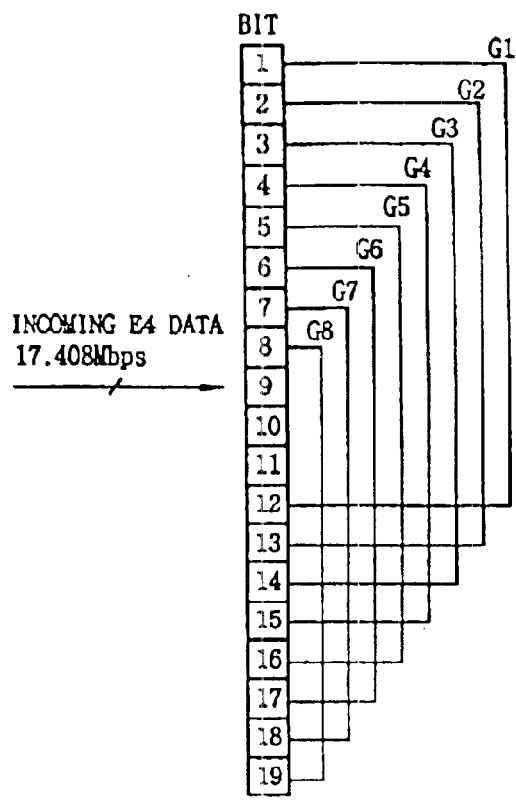
FIG. 1B shows an example of eight 12 bit check groups.
Figure 8:
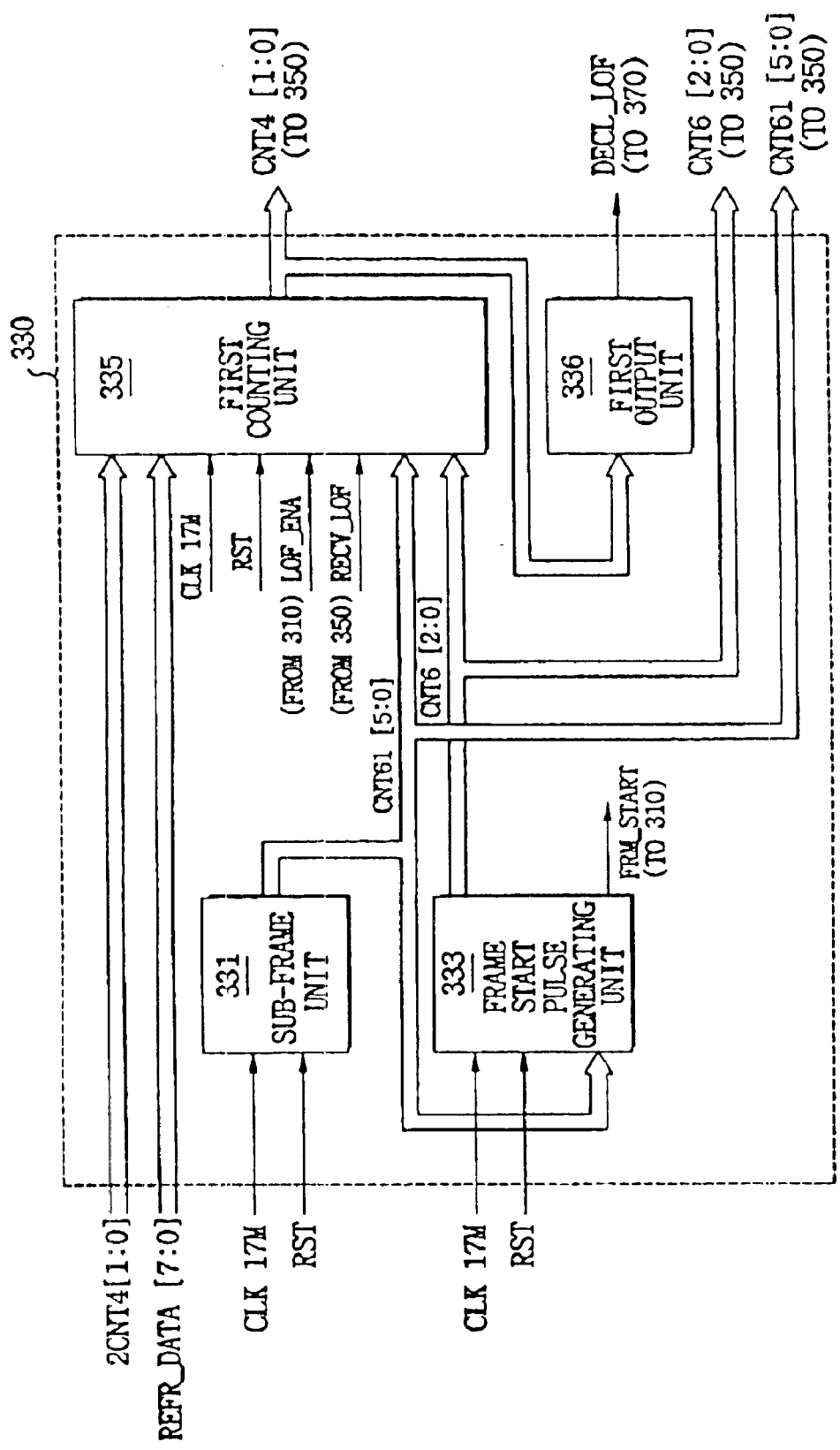
FIG. 8 shows a detailed block diagram of the LOF declaration unit shown in FIG. 7.

In FIG. 1A, an E4 frame start point detecting pattern, defined in ITU-T G.751, uses a 12 bit-Frame Alignment Signal (FAS) "111110100000," as determined by a predetermined rule. As shown in FIG. 1B, 8 check groups (D1~D8) are established by coupling respective 12 bits as single groups among 19 bits when a 139.264 Mbps E4 frame is inputted at every 17.408 Mbps byte-clock. In other words, a group G1 includes bit 1 to bit 12, a group G2 includes bit 2 to bit 13, a group G3 includes bit 3 to bit 14., and a group G8 includes bit 8 to bit 19.

Figure 1C:
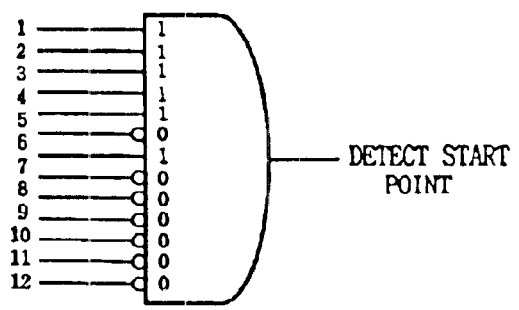
FIG. 1C illustrates a circuit for detecting a frame alignment signal (FAS)

A 12 bit stream of the E4 frame among the groups (G1~G8) that passes through a FAS detecting circuit with a value of "111110100000", results in an output of the circuit shown in FIG. 1C, of a logic "high". When the start point detecting value is "high", a first bit of a corresponding group is a frame start point.

Figure 1D:
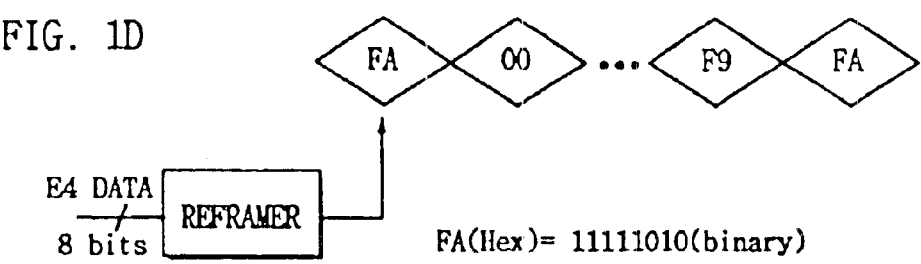
FIG. 1D shows a diagram indicating DS-4E (E4) format passed through a reframer in accordance with a preferred embodiment of the present invention.

FIG. 1D shows a diagram indicating an E4 format passed through a reframer according to a preferred embodiment of the present invention. A flow format of the frames after an incoming E4 data passes through the reframer on a byte by byte basis, should preferably be FA, 00, . . . , F9, FA, etc, in hexadecimal format.

The reframer according to a preferred embodiment of the present invention, detects the frame start point of the incoming E4 data that has an improper start point and provides normal data by processing the normal data from the proper frame start point.

Figure 2:
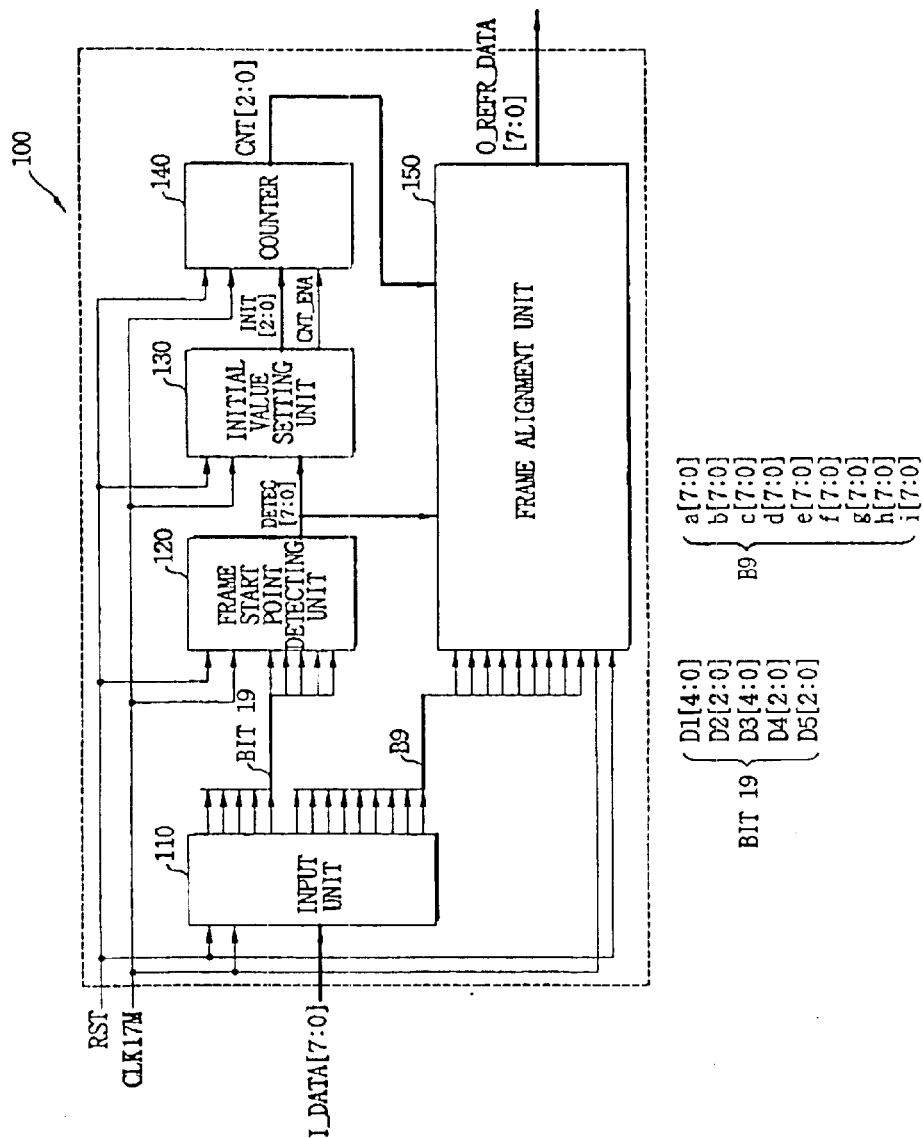
FIG. 2 shows a block diagram of a reframer in accordance with a preferred embodiment of the present invention.

A first preferred embodiment of the reframer according to the present invention will be explained, with reference to FIGS. 2 to 5. As shown in FIG. 2, a reframer 100 includes an input unit 110, a frame start point detecting unit 120, an initial value setting unit 130, a counter 140, a frame alignment unit 150, and is preferably formed on a single chip. Each unit is operated by a reset signal RST and a 17 Mbyte clock signal CLK17M, and is preferably implemented by a high level hardware designing language, like VHDL.

The input unit 110 outputs 9 byte parallel data B9 by shifting an incoming 17 Mbps E4 parallel data I_DATA [7:0], on a byte by byte basis, according to the CLK17M signal, and applies the parallel data B9 to the frame alignment unit 150. The input unit 110 also maps BIT19 for checking the FAS pattern "111110100000" and applies the mapped BIT19 to the frame start point detecting unit 120.

The frame start point detecting unit 120 forms a plurality of frame start point check patterns, for example (G1~G8), as shown in FIG. 1B, by grouping the BIT19, supplied from the input unit 110, into corresponding 12 sequential bits, detects the FAS pattern, and applies a frame start point detecting value DETEC[7:0] in the FAS for the initial value setting unit 130.

The initial value setting unit 130 sets and outputs an initial value INIT[2:0] to the counter 140, and checks for cases having corresponding frame data losses by using the frame start point detecting value DETEC[7:0]. The initial value setting unit 130 also generates a counter enable signal CNT_ENA for driving the counter 140.

The counter 140 counts from the set initial value INIT [2:0] according to the counter enable signal CNT_ENA, and forwards a count value CNT[2:0] to the frame alignment unit 150.

The frame alignment unit 150 checks the data B9 supplied from the input unit 110 by using the frame start point detecting value DETEC[7:0] of the frame start point detecting unit 120 and the count value CNT[2:0] of the counter 140. The frame alignment unit 150 also filters data having an improper start point by checking the data B9, and outputs a reframed data O_REFR_DATA[7:0] having a normal frame.

Figure 3A:
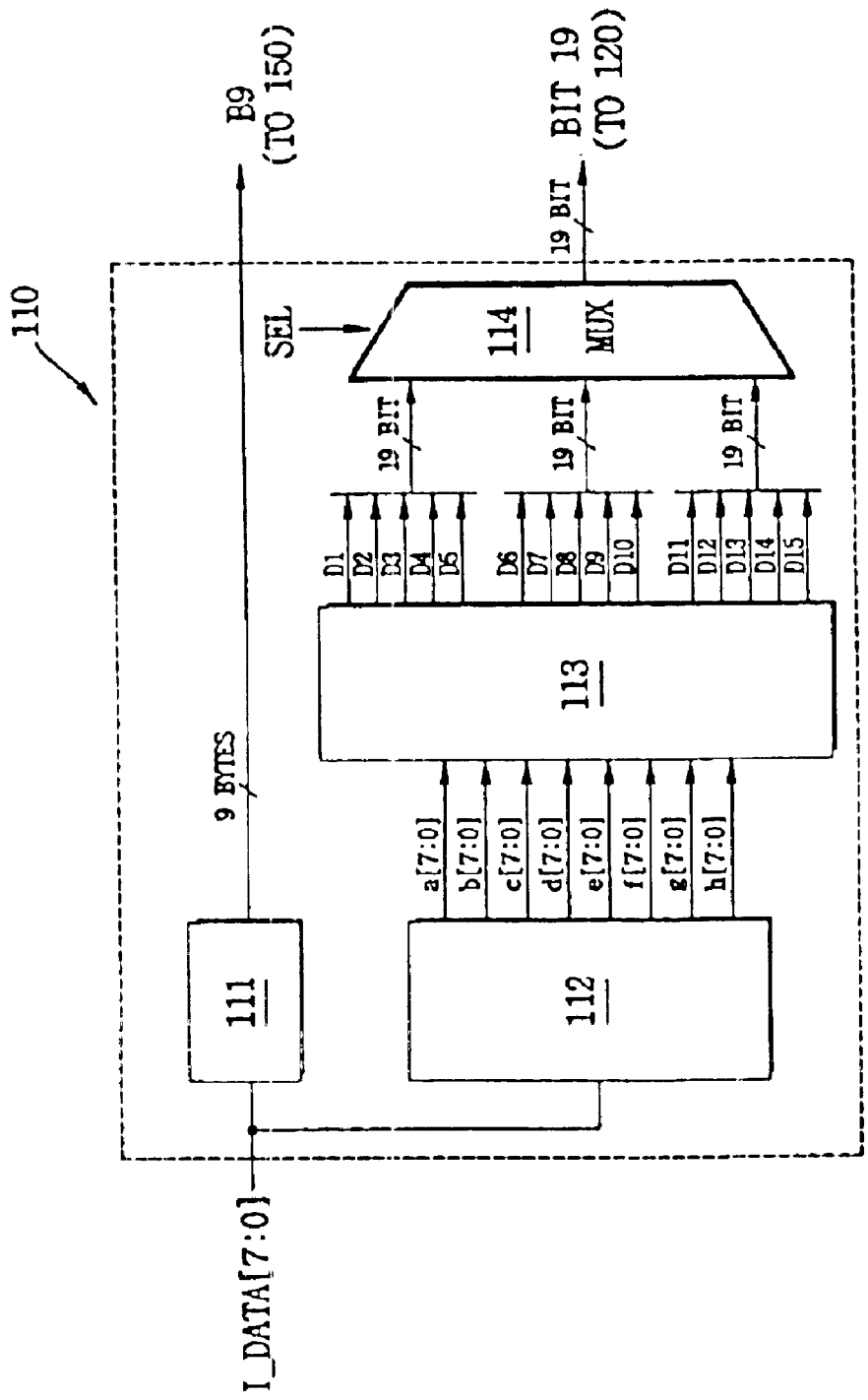
FIG. 3A shows a detailed block diagram of the input unit shown in FIG. 2.

FIG. 3A shows a detailed block diagram of the input unit 110 of FIG. 2, and FIG. 3B shows an output data table based on the input data of FIG. 3A. Referring to FIG. 3A, the input unit 110 includes a B9 shifting unit 111 for outputting the 9 byte parallel data B9; and FAS checking group mapping units 112, 113 and 114 that map a FAS check pattern used for checking the frame start point. The FAS checking group mapping units include a B8 shifting unit 112, a BIT19 grouping unit 113 and a BIT19 selecting unit 114.

The B9 shifting unit 111 receives the 17 Mbps E4 parallel data I_DATA[7:0] on a byte by byte basis, shifts the received data based on the clock signal, and outputs the data B9 in parallel to the frame alignment unit 150. The data B9 is output in a sequence, for example, of a[7:0], b[7:0], c[7:0], d[7:0], e[7:0], f[7:0], g[7:0], h[7:0] and i[7:0].

The B8 shifting unit 112 receives the 17 Mbps E4 parallel data I_DATA[7:0] on a byte by byte basis, shifts the received data based on the clock signal, and outputs 8 byte data in parallel to the BIT 19 grouping unit N3. The data is output in a sequence, for example, of a[7:0], b[7:0], c[7:0], d[7:0], e[7:0], f[7:0], g[7:0] and h[7:0].

The BIT19 grouping unit 113 maps the output data of the B8 shifting unit 112 at every 19 bits by a predetermined rule, forms 3 groups(D1~D5, D6~D10, D11~D15) and outputs the 3 groups to the BIT19 selecting unit 114. The BIT19 selecting unit 114, which is preferably a multiplexor, outputs one of the 3 groups output from the BIT19 grouping unit 113 in sequence according to a selecting signal SEL received from a counter which counts at the 17 Mbyte clock.

A counter, not shown, of the B9 shifting unit 111 increases from "000" to "111", and outputs the data B9, from "a[7:0]" to "h[7:0]" in parallel. When the counter value is "111" and a carry value is "high", a 9$^{th}$ byte, "i[7:0]" is outputted. In other words, the B9 shifting unit 111 shifts the counter value on a byte by byte basis at every period and outputs the data B9. The 9$^{th}$ byte, "i[7:0]" has the same value as a first byte output of a next period, as shown in FIG. 3B. Thereby, it is capable of selecting and searching a pattern of corresponding data without losing data.

In the FAS check group mapping units, the B8 shifting unit 112 shifts the incoming byte data for 8 clocks and outputs 8 byte data from "a[7:0]" to "h[7:0]", for a total of 64 bits in parallel. The BIT19 grouping unit 113 receives the 8 byte data output from the B8 shifting unit 112, groups the data to include 19 bits in sequence, and respectively maps the grouped data to a first group (D1~D5), a second group (D6~D10), and a third group (D11~D15), for a total of 57 bits. The BIT19 selecting unit 114 selects the first, second and third groups(D1~D5, D6~D10, D11~D15) in accordance with the selecting signal SEL, outputs the corresponding 19 bits, and applies the 19 bits to the frame start point detecting unit 120, shown in FIG. 2.

As an example of mapping rules for the first group, for a first period, data D1[4:0] is mapped from input a[7:3], data D2[2:0] is mapped from input a[2:0], data D3[4:0] is mapped from input b[7:3], data D4[2:0] is mapped from input b[2:0], and data D5[2:0] is mapped from input c[7:5]. For a next period, data D1[4:0] is mapped from input b[7:3], data D2[2:0] is mapped from input b[2:0], data D3[4:0] is mapped from input c[7:3], data D4[2:0] is mapped from input c[2:0], and data D5[2:0] is mapped from input d[7:5]. In this example of the preferred embodiment of the present invention, the mapping rules of the second and third groups (D6~D10, D11~D15) are applied similarly to the mapping rule of the first group.

Once the first output(a[7:0]) is mapped, the second output (b[7:0]) is mapped to D1[4:0] and the mapping operation is repeatedly carried out. For a first period, 57 bits among the 64 input bits are checked, and the remaining 7 bits are repeatedly checked over the next period.

Referring to FIG. 2, the frame start point detecting unit 120 receives 19 bit check groups, e.g., D1[4:0], D2[2:0], D3[4:0], D4[2:0] and D5[2:0], from the input unit 110, and detects the defined FAS("111110100000"). The frame start point detecting unit 120 groups 12 bits among the 19 bit check groups to make the 8 FAS check patterns (G1~G8) in sequence, and repeatedly carries out the frame start point detecting procedures until detecting the FAS.

All incoming 8 bits (respective first bit of G1~G8) may be a start point before the frame start point is detected. Once the frame start point is detected, the frame start point detecting unit 120 maintains the frame start point until a power on/off or resetting operation.

The important reason for detecting the FAS is that the frame data is started from the FAS. Further, the first bit following the FAS is important because it indicates that the frame data is a Remote Defect Indication RDI, according to ITU-T G753, 751, 754.

The frame start point detecting unit 120 outputs the frame start point detecting value DETEC[7:0] corresponding to each pattern when 8 frame alignment check patterns (G1~G8) have the FAS "111110100000". The frame start point detecting value DETEC[7:0] shown in FIG. 4, indicates from which bit the FAS starts. In other words, the frame start point detecting value DETEC[7:0] indicates the frame start point and is applied to the initial setting unit 130 and the frame alignment unit 150, as an enable signal.

The initial value setting unit 130 sets an initial value INIT[2:0] for deriving the reframed output from the start point by using the frame start point detecting value DETEC

[7:0] of the frame start point detecting unit 120. In other words, the initial setting unit 130 determines the start bit of the reframed output data. The initial setting unit 130 outputs the initial value INIT[2:0] and a counter enable signal CNT_ENA to the counter 140.

The table in FIG. 4 lists the initial value INIT[2:0], the frame start point detecting value DETEC[7:0], count value CNT[2:0] of the counter 140 and the enable signal CNT_ENA outputted from the counter 140, for input bit sequence check patterns G1 to G8. The operation of the frame start point detecting unit 120, the initial value setting unit 130, and the counter 140 will be explained with reference to the table shown in FIG. 4.

The frame start point detecting unit 120 outputs the frame start point detecting value DETEC[7:0] to the initial value setting unit 130. The initial value setting unit 130 applies the initial value INIT[2:0] to the counter 140, which outputs the reframed data according to the frame start point detecting value DETEC[7:0].

For example, if the FAS is detected in the check pattern G1, then the inputted first bit is a frame start point, FAS detection="high", DETEC[7:0]="10000000", INIT[2:0]="000", and CNT_ENA="high". The counter 140 counts 000, 001, 010, 011, 100, 101, 110, 111, 000, 001, etc. If the FAS is detected in the check pattern G2, then the inputted second bit is the frame start point, FAS detection="high", DETEC[7:0]="01000000", INIT[2:0]="001", and CNT_ENA="high". The counter 140 counts 001, 010, 011, 100, 101, 110, 111, 000, 001, 010, etc. If the FAS is detected in the check pattern G3 then the inputted third bit is the frame start point, FAS detection="high", DETEC[7:0]="00100000", INIT[2:0]="010", and CNT_ENA="high". The counter 140 counts 010, 011, 100, 101, 110, 111, 000, 001, 010, 011, etc. If the FAS is detected in the check pattern G4, then the inputted fourth bit is the frame start point, FAS detection="high", DETEC[7:0]="00010000", INIT[2:0]="011", and CNT ENA="high". The counter 140 counts 011, 100, 101, 110, 111, 000, 001, 010, 011, 100, etc.

Continuing with the example output shown in FIG. 4, if the FAS is detected in the check pattern G5, then the inputted fifth bit is the frame start point, FAS detection="high", DETEC[7:0]="00001000", INIT[2:0]="100", and CNT_ENA="high". The counter 140 counts 100, 101, 110, 111, 000, 001, 010, 011, 100, 101, etc. If the FAS is detected in the check pattern G6, then the inputted sixth bit is the frame start point, FAS detection="high", DETEC[7:0]="00000100", INIT[2:0]="101", and CNT_ENA="high". The counter 140 counts 101, 110, 111, 000, 001, 010, 001, 010, 011, 100, 101, 110, etc. If the FAS is detected in the check pattern G7, then the inputted seventh bit is the frame start point, FAS detection="high", DETEC[7:0]="00000010", IMT[2:0]="110", and CNT_ENA="high". The counter 140 counts 110, 111, 000, 001, 010, 011, 100, 101, 110, 111, etc. If the FAS is detected in the check pattern G8, then the inputted eighth bit is the frame start point, FAS detection="high", DETEC[7:0]="00000001", INIT[2:0]="111", and CNT_ENA="high". The counter 140 counts 111, 000, 001, 010, 011, 100, 101, 110, 111, 000, etc.

In the initial value setting unit 130, the initial value INIT[2:0] is set according to the frame start point detecting value DETEC [7:0], and the counter enable signal CNT_ENA is simultaneously activated to logic "high". The CNT_ENA has logic "low" in other cases, for example, when the counter is not enabled.

The counter 140 may need more than 8 counts to classify 8 check patterns. In this example of the preferred embodiment of the present invention, the counter 140 is established by a ternary counter counting from "0" to "7", from the initial value INIT[2:0], according to the counter enable signal CNT_ENA. A count value CNT[2:0] starts from the initial value INIT[2:0], and counts from "000"(0) to "111" (7).

Finally, the count value CNT[2:0] is applied to the frame alignment unit 150 and used for determining how many bits are abnormal from the frame start point. The frame alignment unit 150 determines the frame start bit from 9 byte parallel input data B9 by using the frame start point detecting value DETEC[7:0] outputted from the frame start point detecting unit 120, and checks the parallel data B9 (a[7:0], b[7:0], c[7:0], d[7:0], e[7:0], f[7:0], g[7:0], h[7:0], and i[7:0]) inputted from the input unit 110 according to the count value CNT[2:0] of the counter 140. The frame alignment unit 150 excludes the abnormal bits and outputs the reframed data O_REFR_DATA[7:0] from the normal frame start point. In addition, the frame alignment unit 150, outputs "00000000" as the reframed data O_REFR_DATA [7:0] when the frame start point detecting value DETEC [7:0] has a value other than "10000000", "01000000", "00100000", "00010000", "00001000", "00000100", "00000010", and "00000001".

Referring to FIGS. 5A to 5H, the output reframed data format of the frame alignment unit 150 will be described for 8 cases, according to the frame start point detecting value DETEC[7:0].

Figure 5A:
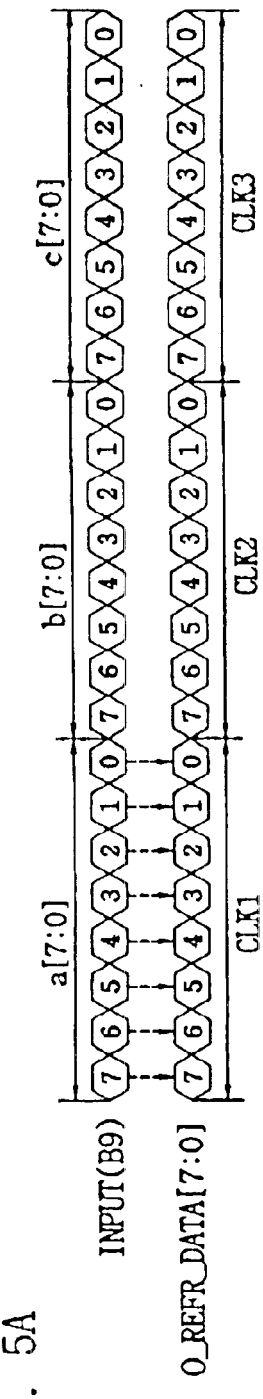
FIGS. 5A~5H show diagrams explaining a reframed output data from the frame alignment unit shown in FIG. 2.
Figure 5B:
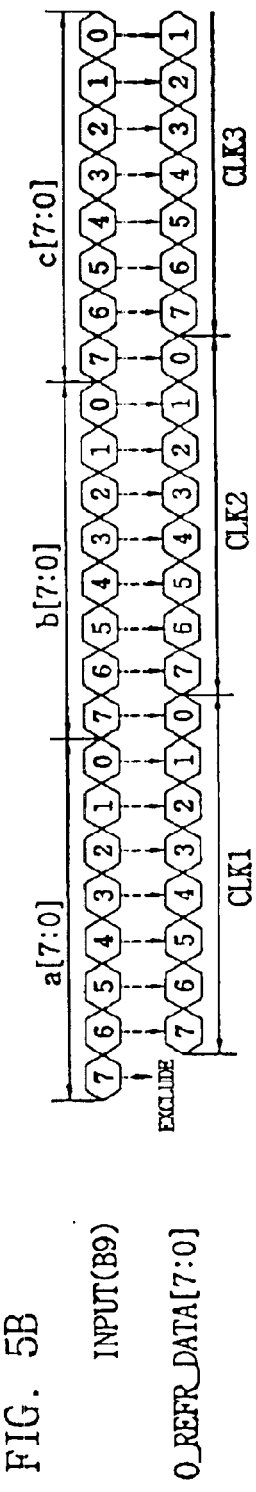
Figure 5C:
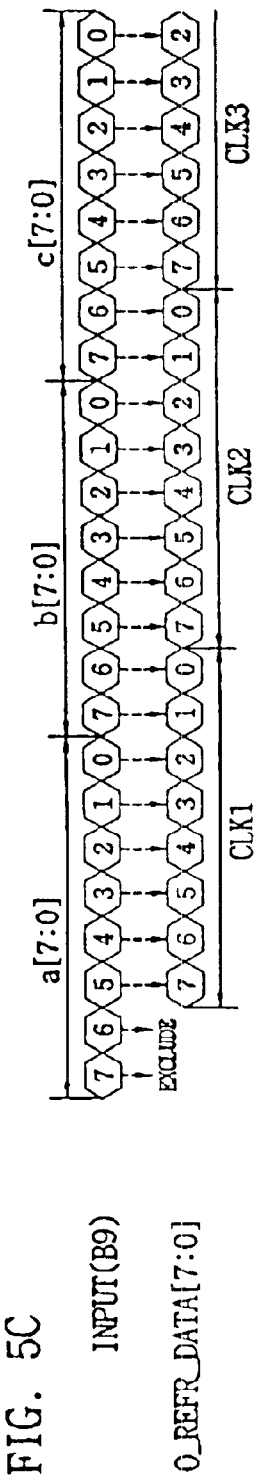

As shown in FIG. 5A, if the frame start point detecting value DETEC[7:0]="10000000" and the initial value INIT [2:0]="000", then input data a[7:0], b[7;0], c[7:0], d[7;0], e[7:0], f[7:0], g[7:0], h[7;0], and i[7:0], are sequentially outputted to the output reframed data O_REFR_DATA [7:0] on a byte by byte basis. Referring to FIG. 5B, if the frame start point detecting value DETEC[7:0]="01000000" and the initial value INIT[2:0]="001", then the first bit of the input data is excluded, and the output reframed data O_REFR_DATA[7:0] is outputted from the second bit on a byte by byte basis. As shown in FIG. 5C, if the frame start point detecting value DETEC[7:0]="00100000," and the initial value INIT[2:0]="010", then the first two bits of the input data are excluded, and the output reframed data O_REFR_DATA[7:0] is outputted from the third bit on a byte by byte basis.

Figure 5D:
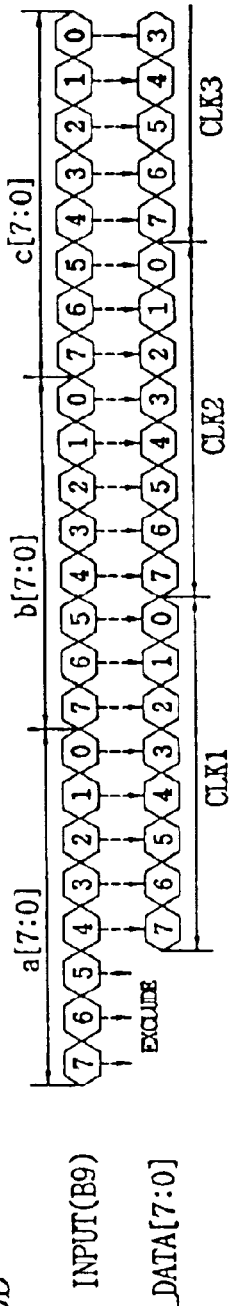
Figure 5E:
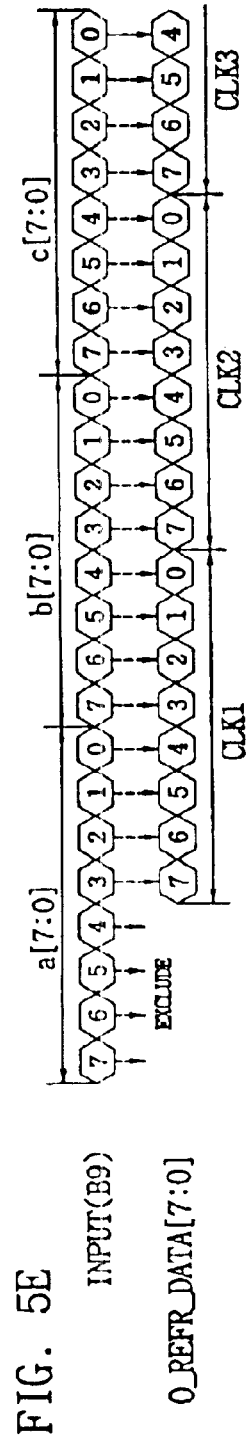
Figure 5F:
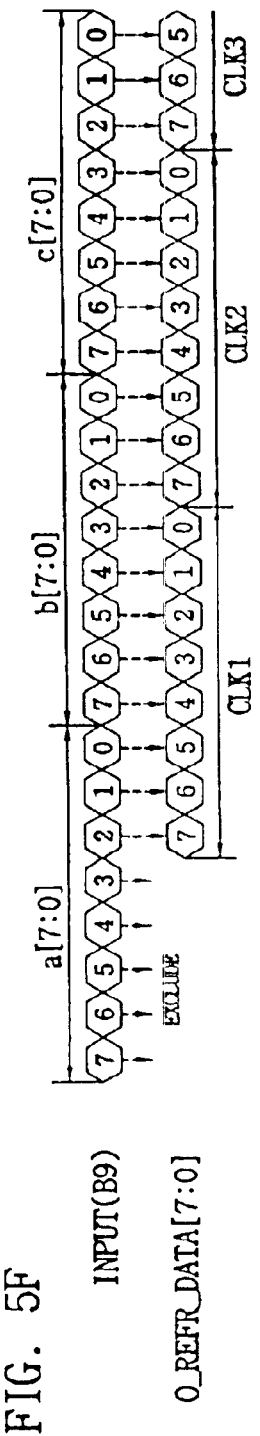
Figure 5G:
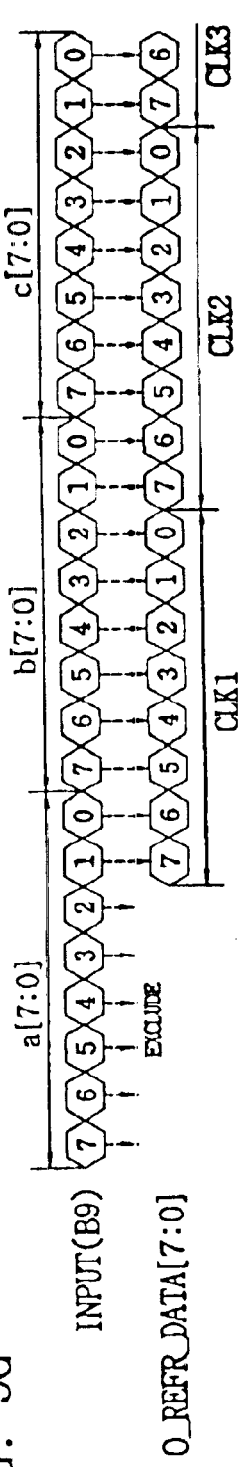
Figure 5H:
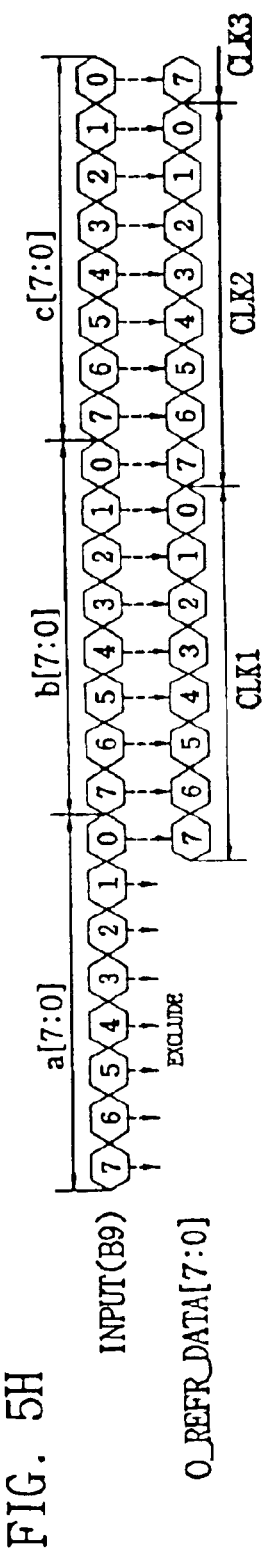

FIGS. 5D to 5H show similar processing, where the number of bits having sync error are excluded according to the frame start point detecting value DETEC[7:0] and the initial value INIT[2:0], and the output reframed data O_REFR_DATA is outputted from the next bit after the sync error bits on a byte by byte basis. In other words, the first 3 bits are excluded when the frame start point detecting value DETEC[7:0]="00010000" and the initial value INIT [2:0]="011", as shown in FIG. 5D. The first 4 bits are excluded when the frame start point detecting value DETEC [7:0]="00001000" and the initial value INIT[2:0]="100", as shown in FIG. 5E. The first 5 bits are excluded when the frame start point detecting value DETEC[7:0]="00000100" and the initial value INIT[2:0]="101", as shown in FIG. 5F. The first 6 bits are excluded when the frame start point detecting value DETEC[7:0]="00000010" and the initial value INIT[2:0]="110", as shown in FIG. 5G. Further, the first 7 bits are excluded when the frame start point detecting value DETEC[7:0]="00000001" and the initial value INIT [2:0]="111", as shown in FIG. 5H.

Excluding the corresponding number of bits provides the benefit of protecting the data having an abnormal start point from processing in the next unit or apparatus. This prevents operating errors that may result from several frames of inaccurate data that may be inputted during power on/off or resetting operations.

As shown back in FIG. 4, if the FAS is detected in the check pattern G5, then the frame start point detecting value DETEC[7:0] is "00001000", the initial value INIT[2:0] is "100", and the count value CNT[2:0] output from the counter 140 is "100, 101, 110, 111, 000, 001, 010, 011, 100, 101 . . . " from the first output after the reset operation. Further, a normally aligned frame data is outputted, by excluding the first 4 bits and outputting the next bits on a byte by byte basis, as shown in FIG. 5E.

Even though 139.264 Mbps data is normally inputted, the remaining bits after the first bit may have errors. Therefore, input bits of the input data B9 having sync error data should be excluded until more than 10 frames of the data are synchronous.

The reframer 100 of the preferred embodiment of the present invention is capable of preventing erroneous signal generation by searching the frame start point, aligning the data to correct for errors, and applying the aligned data to a peripheral unit. If the input data is processed without passing through the reframer 100, then the start point of the data is unknown.

In another preferred embodiment of the present invention, a plurality of reframers 100 may be arranged on a single chip, and a plurality of STM-n channel signals may be processed simultaneously. For example, a single chip may employ 4 cards for processing a four-channel E4 signal, (e.g. STM-1(155.520 Mbps) signals) simultaneously. The single chip may also be designed to process other signals, such as STM-4(622 Mbps), STM-16(2.5 Gbps), and STM-64(10 Gbps) signals.

Figure 6:
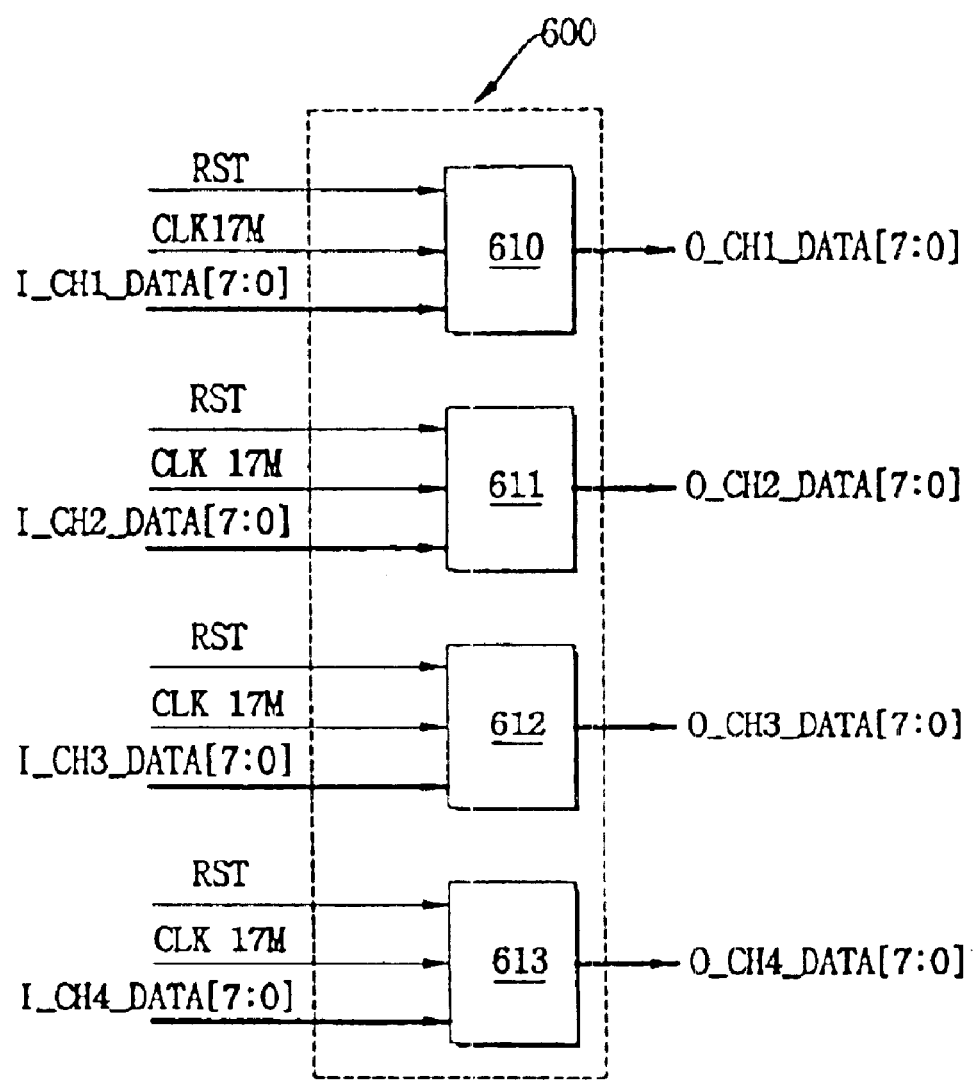
FIG. 6 shows a circuitry diagram of a single chip for providing multi-channel DS-4E data frame alignment in accordance with a preferred embodiment of the present invention.

Referring to FIG. 6, a chip 600 includes 4 reframers 610, 611, 612, and 613 for executing the reframe process of four channel E4 parallel data. Each reframer 610, 611, 612, and 613 has substantially similar configurations as the reframer 100 shown in FIG. 2, and provides a similar operation. In other words, the reframers 610, 611, 612 and 613 detect the frame start point by using input data I_CHi_DATA[7:0] of each channel, and excludes data having an improper start point. The reframers 610, 611, 612 and 613 apply the reframed output data O_CHi_DATA[7:0] of each channel to a respective peripheral unit.

In another preferred embodiment of the present invention, a Loss Of Frame LOF checking apparatus senses frame loss declaration and frame loss release automatically by continuously checking the reframed data. The LOF check apparatus may prevent abnormal reframed data from transmitting, in which case the abnormal reframed data is generated by an IC error operation (caused by several reasons, such as overload or overcurrent). The LOF check apparatus provides the advantages that a system manager may check for causes of the error and problems by reporting the data status to a user and/or a main process board. The status indicates whether the system has normal data or abnormal data in the LOF check apparatus.

Figure 7:
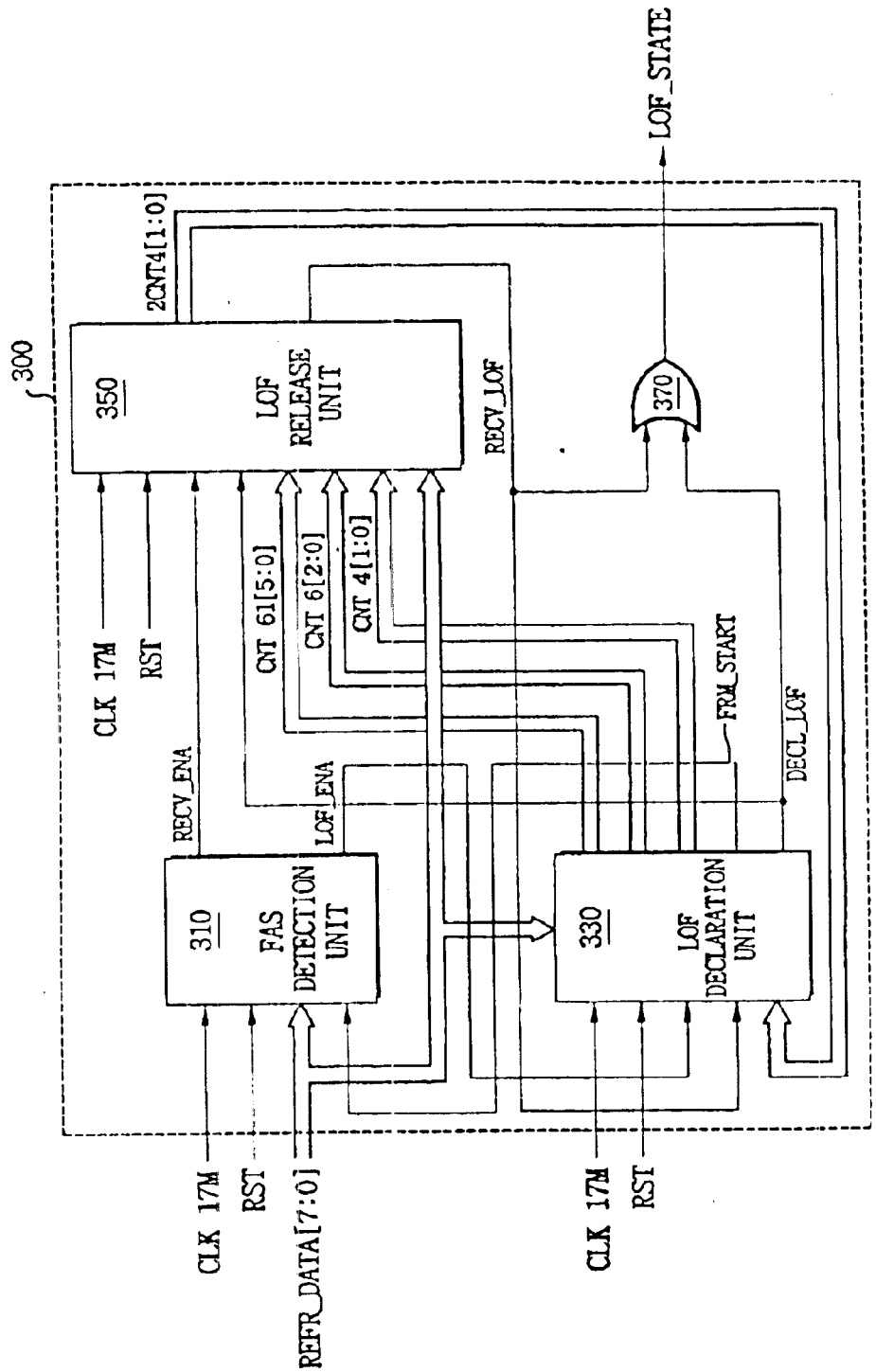
FIG. 7 shows a block diagram of a LOF checking device in accordance with a preferred embodiment of the present invention.

FIG. 7 shows a block diagram of the LOF check device 300 according to the present invention. The LOF check device 300 includes an FAS detection unit 310, a LOF declaration unit 330, a LOF release unit 350, and a LOF output unit 370. Each unit is operated by a reset signal RST and a 17 Mbps clock CLK17M. Each unit may be established by a high level designing language, such as VHDL.

The FAS detection unit 310 receives reframed data REFR_DATA[7:0], determines if the first byte inputted at a frame start pulse position is "11111010", and outputs a LOF release enable signal RECV_ENA or a LOP declaration enable signal LOF_ENA.

The LOF declaration unit 330 outputs a LOF declaration signal DECL_LOF, in serial, if the reframed data REFR_DATA[7:0] of, for example, "11111010", is not inputted for more than a predetermined number of frames(for example, more than 4 frames) at the frame start pulse location.

The LOF release unit 350 receives the LOF release enable signal RECV_ENA from the PAS detection unit 310 and the LOF declaration signal DECL_LOF from the LOF declaration unit 330, and outputs a LOP release signal RECV_LOP if the incoming data, for example, "11111010", is inputted at the frame start pulse location for more than the predetermined number of frames.

The LOF output unit 370 receives the LOF declaration signal DECL_LOF from the LOF declaration unit 330 and the LOF release signal RECV_LOF from the LOF release unit 350, and outputs a LOF state signal LOF_STATE.

FIG. 8 illustrates a detailed block diagram of the LOF declaration unit 330 as shown in FIG. 7. The LOF declaration unit 330 includes a sub-frame unit 331, a frame start pulse generating unit 333, a first counting unit 335 and a first output unit 336. The sub-frame counter 331 counts 61 byte sub-frame CNT61, which is, the column length of a frame, according to the 17 Mbyte clock signal CLK17M.

Figure 9:
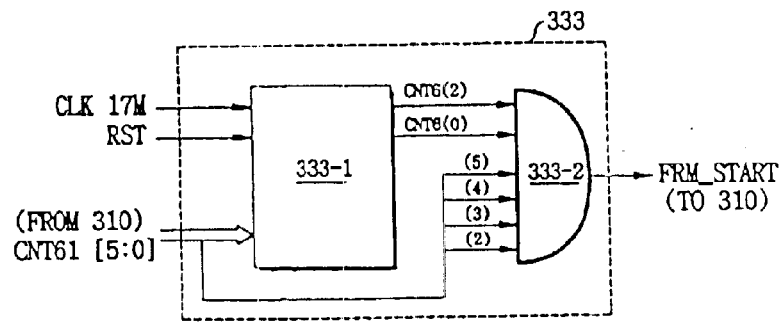
FIG. 9 shows a detailed block diagram of the frame start pulse generating unit shown in FIG. 8.

FIG. 9 shows a detailed block diagram of a frame start pulse generating unit 333 in FIG. 8. The frame start pulse generating unit 333 includes a frame counter 333-1 and an AND gate 333-2. The frame counter 333-1 receives a count value CNT61[5:0] of the sub-frame counter 331 and counts a certain number of sub-frames CNT6 (e.g., 6 rows of a frame). The AND gate 333-2 generates a frame start pulse signal FRM_START at every frame by logical operating the CNT61 bit value and the CNT6 bit values, and applies the frame start pulse signal FRM_START to the FAS detection unit 310 of the LOF check device 300. Therefore, the FAS detection unit 310 searches the first byte (8 bits) inputted a frame start location whenever each frame start pulse signal FRM_START becomes logic "high".

The first counting unit 335 of the LOF declaration unit 330 receives the reframed data REFR_DATA[7:0], the count result 2CNT4 and the LOF release signal RECV_LOF of the LOF release unit 350. In addition, the first counting unit 335 receives the LOF enable signal LOF_ENA from the FAS detection unit 310, the count result CNT61[5:0] from the sub-frame unit 331, and the count result CNT6[2:0] from the frame start pulse generating unit 333. The first counting unit 335 counts the number of times the reframed data REFR_DATA[7:0] of, for example, "11111010", is at the frame start pulse location, and outputs the count result CNT4[1:0] to the LOF release unit 350 when the number of times is more than the predetermined number, for example, 4.

The first output unit 336 outputs a LOF declaring signal DECL_LOF to the LOF output unit 370, as shown in FIG. 7, according to the count result CNT4[1:0] of the first counting unit 335. The LOF declaring signal DECL_LOF indicates that the LOF state signal LOF_STATE is declared when the reframed data REFR_DATA[7:0] is not, for example, "11111010", for more than the predetermined number of frames (e.g. 4 frames) at the frame start pulse location. The LOF declaring signal DECL_LOF indicates that no LOF state is maintained, when the reframed data REFR_DATA[7:0] of, for example, "11111010", is serially inputted more than the predetermined number if frames.

Figure 10:
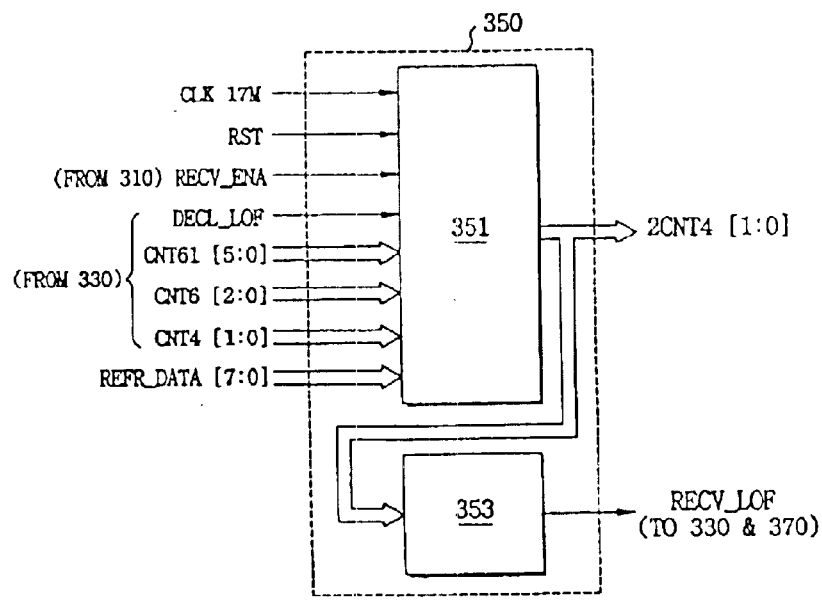
FIG. 10 shows a detailed block diagram of the LOF release unit shown in FIG. 7.

FIG. 10 shows a detailed block diagram of the LOF release unit 350 shown in FIG. 7. The LOF release unit 350 includes a second counting unit 351 and a second output unit 353.

The second counting unit 351 receives the reframed data REFR_DATA[7:0], the LOF release enable signal RECV_ENA from the FAS detection unit 310, and the LOF declaring signal DECL_LOF and count results CNT61[5:0], CNT6[2:0], and CNT4[1:0] from the LOF declaring unit 330. The second counting unit 351 counts the number of the reframed data REFR_DATA[7:0], that is, for example, "11111010", at the frame start pulse location in the LOF declaring state, and outputs the count result 2CNT4[1:0] if the number of the reframed data is inputted more than the predetermined number.

The second output unit 353 outputs the LOF release signal RECV_LOF according to the count result 2CNT4[1:0] of the second counting unit 351. The LOF release signal RECV_LOF indicates that the LOF state is released when more than the other predetermined number, for example, 3 frames, successively receive "11111010" at the frame start pulse location in the LOF declaring state. The LOF release signal RECV_LOF indicates that the LOF declaring state is maintained when the reframed data REFR_DATA[7:0] is not, for example, "11111010", for the other predetermined number of frames.

Referring to FIGS. 7, 8 and 9, the LOF check device 300 receives the reframed data REFR_DATA [7:0], generates the frame start pulse FRM_START at every frame start point, checks the incoming first byte (e.g., the first 8 bit of the FAS), and detects the LOF declaring state and the LOF release state, automatically.

Figure 11:
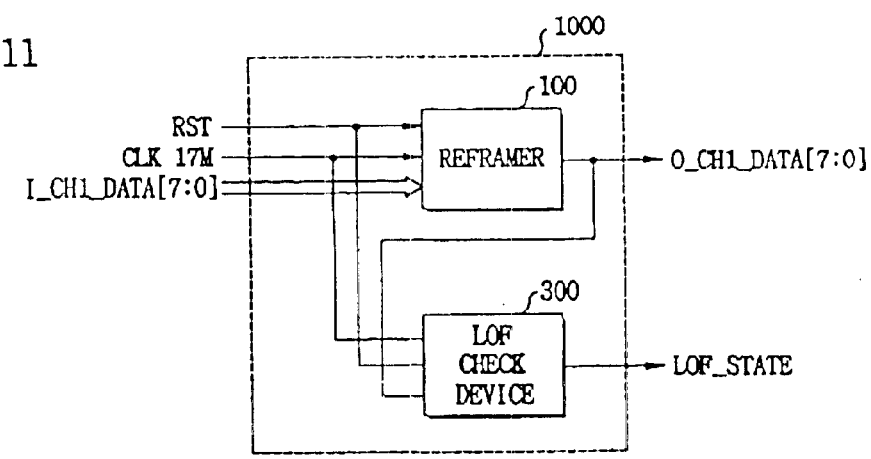
FIG. 11 shows a circuitry diagram of a single chip having a reframer and a LOP check device, in accordance with another preferred embodiment of the present invention.

FIG. 11 shows a block diagram of the reframer 100 and the LOF check device 300 installed on a single chip 1000 according to another preferred embodiment of the present invention. In the single chip 1000, the reframer 100 and the LOF check device 300 receive the reset signal RST and the 17 Mbps clock signal CLK17M.

The reframer 100 also receives the E4 data I_CH1_DATA[7:0], selects the frame start point by using the FAS, for example, "111110100000", of the E4 data, and outputs the reframed data O_$_{CH}$1_DATA[7:0] from the frame start point.

The LOF check device 300 outputs a LOF state signal LOF_STATE which indicates the LOF declaring state and the LOF release state, by checking whether the incoming data is the first 8 bits "11111010" of the frame alignment signal FAS at every frame start point of the reframed data O_CH1_DATA[7:0]. The LOF state signal LOF_STATE is transmitted to the user or the supervising board. Accordingly, it is capable of stabilization of the system by sensing the error, immediately.

In yet another preferred embodiment of the present invention, the reframer 100 and LOF check device 300 for carrying out a reframe process and a LOF check is provided on a chip 2000. The reframer 100 includes a serial/parallel data reframer, and will be discussed below. The chip may select an input data signal at 139.264 Mbps and an output signal at 17.408 Mbps.

The chip 2000 includes a circuit for converting data from serial to parallel, or from parallel to serial, in order to apply the 139.264 Mbps serial data when the reframer 100 and LOF check device 300 are designed for processing 17.408 Mbps parallel data. Accordingly, the chip 2000 includes a serial (parallel)/parallel (serial) converting logic circuit on an input unit and an output unit, respectively, for use with any data interface system.

Figure 12:
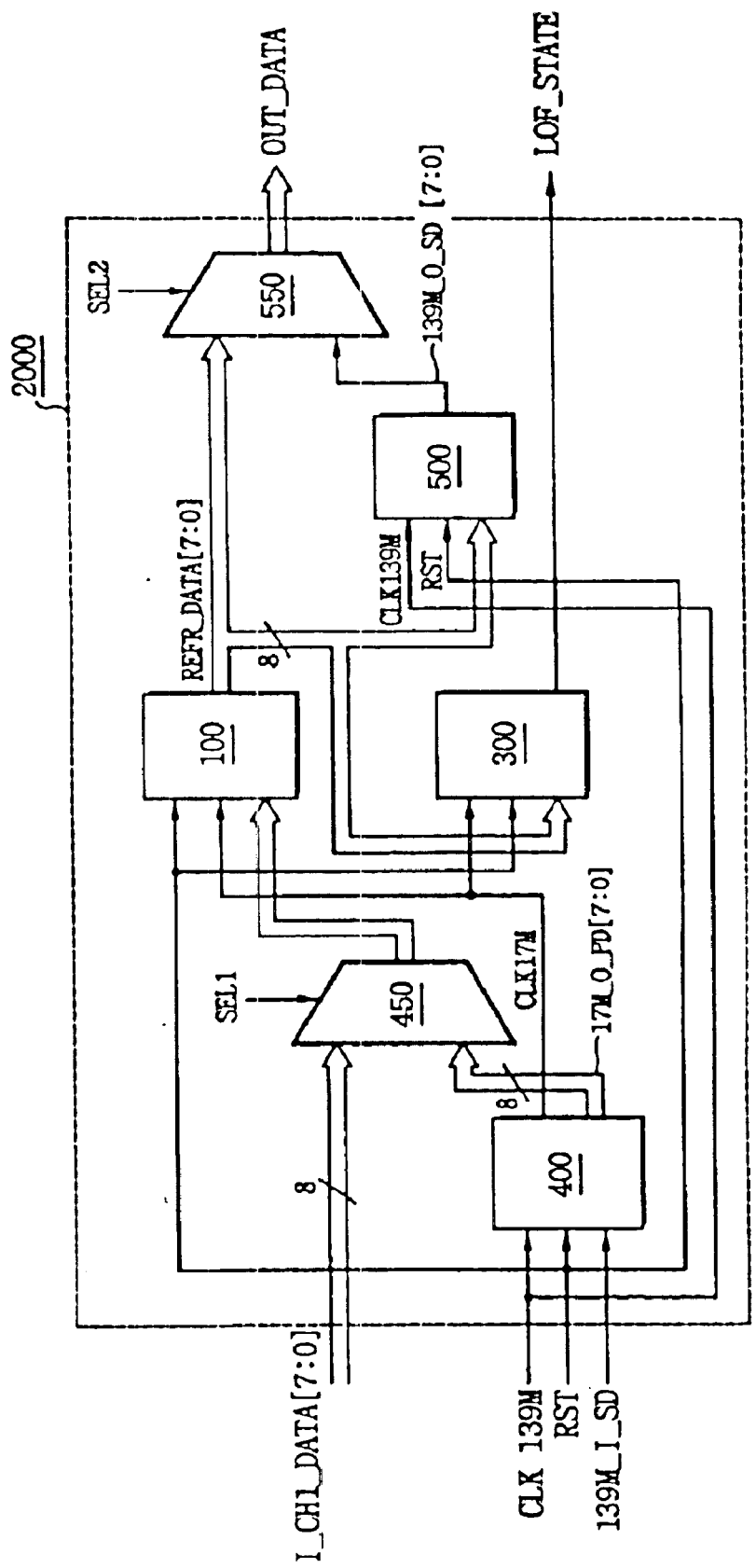
FIG. 12 shows a circuitry diagram of a single chip having a serial/parallel data reframer and a LOF check device in accordance with another preferred embodiment of the present invention.

FIG. 12 shows a block diagram of a single chip 2000, according to yet another preferred embodiment of the present invention. The chip 2000 includes a serial/parallel converting unit 400, an input selecting unit 450, a reframer 100, a LOF check device 300, a parallel/serial converting unit 500 and an output selecting unit 550.

The serial/parallel converting unit 400 receives 139M serial data 139M_I_SD according to the 139.264 Mbps clock signal CLK139M, converts the 139M_I_SD to a 17M parallel data 17M_O_PD[7:0] according to the 17.408 Mbps clock signal CLK17M and then outputs the 17M parallel data 17M_O_PD[7:0] and the 17.408 Mbps dock signal CLK17M.

The input selecting unit 450 selects one of an incoming 17M parallel data I_CH1_DATA[7:0] and the converted 17M parallel data 17M_O_PD[7:0] according to a first selecting signal SEL1, and applies the selected data to the reframer 100.

The reframer 100 receives the 17M parallel data 17M_O_PD[7:0] outputted from the input selecting unit 450 according to the 17.408 Mbps clock signal CLK17M, and outputs the reframed data REFR_DATA[7:0]. The LOF checking unit 300 receives the reframed data REFR_DATA [7:0] according to the 17.408 Mbps clock signal CLK17M, checks that the successive frame state is normal, and outputs the LOF state signal LOF_STATE.

The parallel/serial converting unit 500 receives the reframed data REFR_DATA[7:0] according to the 139.264 Mbps clock signal CLK139M, converts the data to a 139M serial data 139M_O_SD[7:0] and outputs the converted serial data 139M_O_SD[7:0]. The output selecting unit 550 selects one of the reframed data REFR_DATA[7:0] and the 139M serial data 139M_O_SD[7:0] according to a second selecting signal SEL2, and applies an output data OUT_DATA to an outer device.

Figure 13:
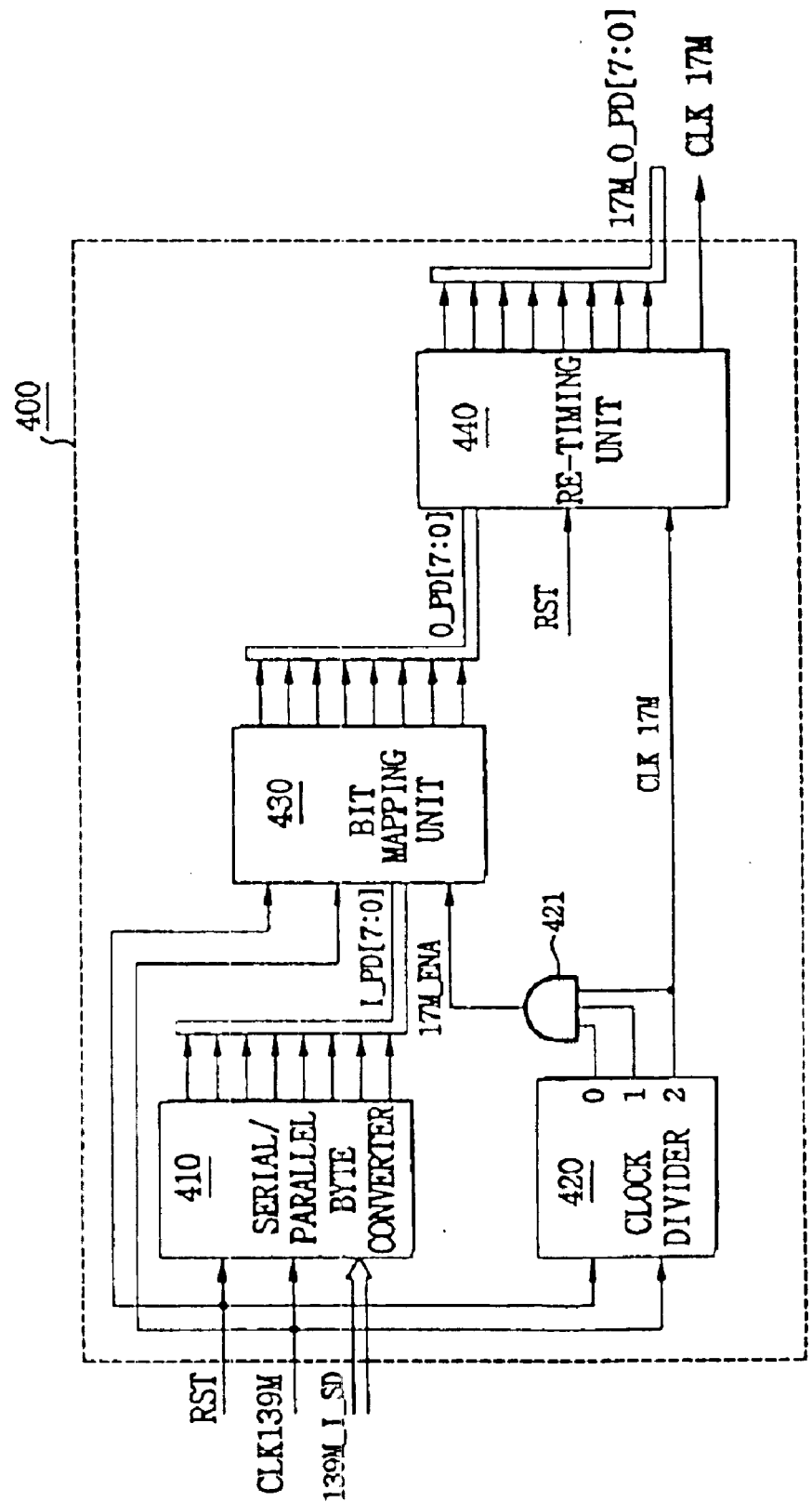
FIG. 13 shows a detailed block diagram of the serial/parallel converting unit shown in FIG. 12.

FIG. 13 shows a detailed block diagram of the serial/parallel converting unit 400 as shown in FIG. 12. The serial/parallel converting unit 400 includes a serial/parallel byte converter 410, a clock divider 420, a bit mapping unit 430, and a re-timing unit 440.

The serial/parallel byte converter 410 shifts the 139M serial data 139M_O_SD according to the 139.264 Mbps clock signal CLK139M, on a byte by byte basis, converts the 139M serial data 139M_O_SD to parallel data I_PD[7:0], and outputs the parallel data I_PD[7:0] to the bit mapping unit 430.

The clock divider 420 counts the 139M clock signal CLK139M as 8 count bits, and outputs a result of each count bit. A Most Significant Bit (MSB) among the count bits is used for the 17M clock signal CLK17M output to the re-timing unit 440. In this example, three count bits are used for generating a 17M enable signal 17M_ENA by a logical AND operation via the AND gate 421.

The bit mapping unit 430 receives the parallel data I_PD[7:0] from the serial/parallel byte converter 410, and outputs a parallel data O_PD[7:0], mapped by a constant bit mapping rule, in accordance with the 17M enable signal 17M_ENA and the 139.264 Mbps dock signal CLK139M.

For example, when the 17M enable signal 17M_ENA is 1(high), the bit mapping rule using the 139.264 Mbps clock signal CLK139M is:

I_PD[0]=>O_PD[7],
I_PD[1]=>O_PD[6],
I_PD[2]=>O_PD[5],
I_PD[3]=>O_PD[4],

I_PD[4]=>O_PD[3],
I_PD[5]=>O_PD[2],
I_PD[6]=>O_PD[1], and
I_PD[7]=>O_PD[0].

The re-timing unit 440 receives the 17.408 Mbps clock signal CLK17M from the clock divider 420 and parallel data O_PD[7:0] mapped from the bit mapping unit 430, and outputs a parallel data 17M_O_PD[7:0] synchronized by the 17.408 Mbps clock signal CLK17M.

Figure 14:
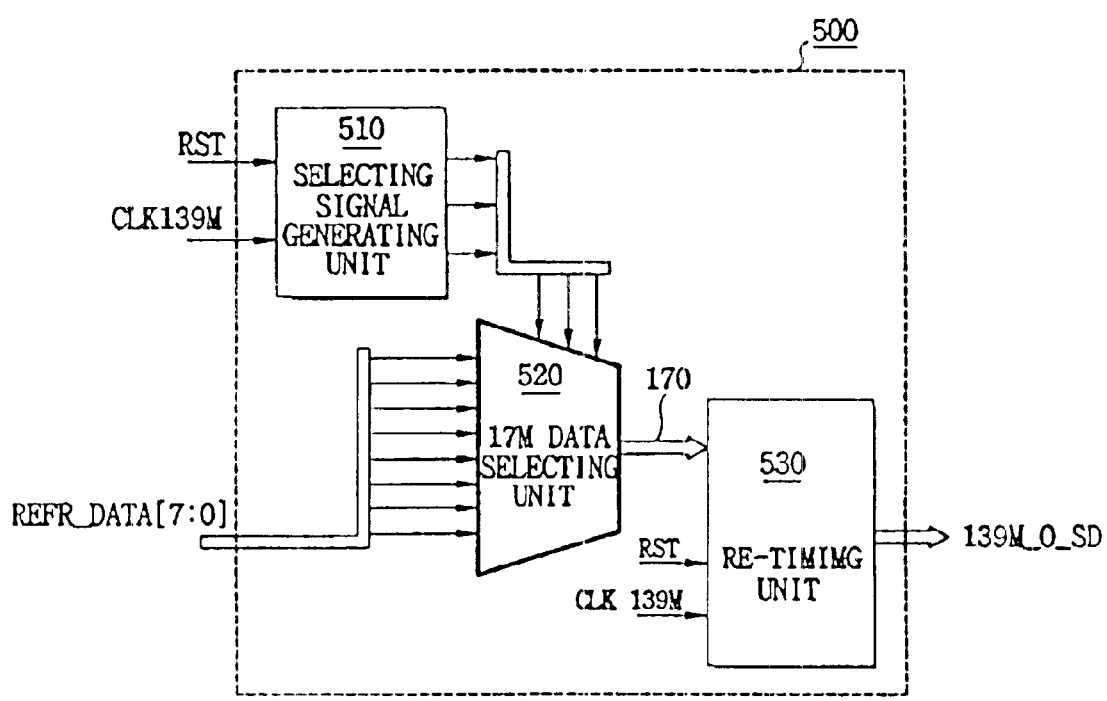
FIG. 14 shows a detailed block diagram of the parallel/serial converting unit shown in FIG. 12.

FIG. 14 shows a detailed block diagram of the parallel/serial converting unit 500 as shown in FIG. 12. The parallel/serial converting unit 500 includes a selecting signal generating unit 510, a 17M data selecting unit 520, and a re-timing unit 530.

The selecting signal generating unit 510 counts a 139.264 Mbps clock signal CLK139M to generate a selecting signal. The 17M data selecting unit 520 receives the reframed parallel data REFR_DATA[7:0] from the reframer 100 and the selecting signal from the selecting signal generating unit 510, selects one bit of the reframed parallel data REFR_DATA[7:0] according to the selecting signal, and outputs the one bit as a serial data 170. For example, a bit selecting sequence is:

The bit is REFR_DATA[7], when the selecting signal is "000";
The bit is REFR_DATA[6], when the selecting signal is "001";
The bit is REFR_DATA[5], when the selecting signal is "010";
The bit is REFR_DATA[4], when the selecting signal is "011";
The bit is REFR_DATA[3], when the selecting signal is "100";
The bit is REFR_DATA[2], when the selecting signal is "101";
The bit is REFR_13 DATA[1], when the selecting signal is "110"; and,
The bit is REFR_DATA[0], when the selecting signal is "111".

The re-timing unit 530 receives the serial data 170 from the 17M data selecting unit 520 and outputs a reframed serial data 139M_O_SD by synchronizing the serial data 170 to the 139.264 Mbps clock signal CLK139M.

Referring to FIGS. 12, 13 and 14, the reframer 100 and LOF check device 300, according to yet another preferred embodiment of the present invention includes the serial/parallel converter 400, and the input selecting unit 450, on an input part of the reframer 100 and LOF check device 300, and includes the parallel/serial converting unit 500 and the output selecting unit 550 on an output part of the reframer 100 and LOF check device 300, respectively. Regardless of the data format, the chip 2000 is capable of inputting and outputting data by the interface defined by the user. In addition, the chip 2000 may minimize overload and power in the circuit by designing the reframer 100 and the LOF check device 300 to process the data in parallel.

The reframer 100 excludes a frame error of the input data having an improper start point, thereby improving the normal signal processing speed as well as the overall system stabilization.

The present invention may be used for a 2.5G SDH apparatus for exporting, related to Application Specific IC (ASIC), and for a transmission apparatus for E4 signals. Additionally, the present invention may be more efficiently applicable to 622 Mbps E4 signal apparatus(or over 622 Mbps type) which requires the simultaneous use of several channels, because a single chip may process a 4 channel E4 signal. The reframe chip can be installed on the respective four E4 boards in case that the E4 signal is applied to the 622 Mbps apparatus. Therefore, it is easy to arrange the elements, utilize the space efficiently, and diminish the board size, for cutting down cost. It is understood that the preferred embodiments are not limited to the E4 signals only, but can also be applied to other signal structures similar to the E4 structure, to carry out the reframe process and the LOF checking process.

The disclosed reframer and LOF check apparatus of the preferred embodiments of the present invention is applicable to digital hierarchy signals (for example, E3) having a frame structure the same as or similar to the E4 signal frame structure. Further the LOF checking apparatus is designed for automatic LOF declaring and releasing operations by checking the reframed data continuously, to sense the error immediately and perform operations for stabilization of the system.

The foregoing embodiments and advantages are merely exemplary and are not to be construed as limiting the present invention. Further, it is understood that the preferred embodiments are not limited to the E4 signal, but can also be applied to other signal structures similar to the E4 structure. The present teachings can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A reframer, comprising:

a first circuit that detects a frame start point of input data based on a frame alignment signal defined in a framed data of a digital hierarchy signal, the first circuit designating a start location of the frame alignment signal as a frame start point detecting value; and a second circuit that excludes the input data having an improper start point based on the frame start point detecting value, and that outputs reframed data having a normal frame format, wherein the reframed data is based on the excluded input data, wherein the fast circuit includes:

an input selecting circuit that shifts the input data, maps respective bits of the shifted input data, and selects a plurality of checking patterns on a bit by bit basis according to the shifted input data;

a frame start point detecting circuit that receives the checking patterns outputted from the input selecting circuit, and that detects the frame start point which designates the start location of the frame alignment signal as the frame start point detecting value;

an initial value setting circuit that sets an initial value for counting improper input data based on the frame start point detecting value, and that generates a control signal; and a counter that counts a number of input data bits having improper data, as count results, from the frame start point, according to the control signal and the initial value.

2. The reframer of claim 1, wherein the input selecting circuit includes:
   a first shifter that shifts the input data into a first format and that sequentially outputs the first format shifted input data in parallel to the second circuit.

3. The reframer of claim 2, wherein the input selecting circuit further includes:
   a second shifter that also receives the input data having the digital hierarchy structure, shifts the input data into a second format different from the first format according to a designated clock signal, and outputs the second format shifted input data in parallel;
   a bit grouping circuit that maps the second format shifted input data to form the plurality of checking patterns according to a designated rule, and outputs groups of the checking patterns; and
   a checking pattern selecting output circuit that selectively outputs the plurality of checking patterns outputted from the bit grouping circuit at successive checking periods.

4. The reframer of claim 1, wherein the input selecting circuit maps portions of the shifted input data from an upper bit, and forms a plurality of checking patterns, each checking pattern having the same length as the frame alignment signal.

5. The reframer of claim 4, wherein the input selecting circuit sets a last portion of the shifted input data from a first period, as a first data portion for a next period, and sequentially maps the shifted framed data.

6. The reframer of claim 1, wherein the frame start point detecting circuit repeatedly performs a start point detecting operation until a predetermined frame alignment signal is detected, and determines the frame start point detecting value according to an input data bit order, to indicate a frame alignment signal start bit.

7. The reframer of claim 6, wherein the frame start point detecting value is continuously maintained until a reset signal is inputted or a power source is turned off.

8. The reframer of claim 1, wherein the second circuit includes a frame alignment circuit that aligns the shifted input data according to the frame start point detecting value and the count result, and that outputs the aligned shifted input data as reframed data.

9. The reframer of claim 8, wherein the frame alignment circuit locates a frame start bit among the shifted input data based on the frame start point detecting value, and excludes data bits having an improper start point among the shifted input data according to the count result.

10. The reframer of claim 1, wherein the frame alignment signal is a 12 bit signal.

11. The reframer of claim 1, wherein the first circuit comprises an input selecting circuit that shifts the input data, maps respective bits of the shifted input data, and selects a plurality of checking patterns on a bit by bit basis according to the shifted input data and a frame start point detecting circuit that receives the checking patterns outputted from the input selecting circuit, and that detects the frame start point which designates a start location of the frame alignment signal as the frame start point detecting value.

12. The reframer of claim 1, wherein the first circuit comprises an initial value setting circuit that sets an initial value for counting improper input data based on the frame start point detecting value, and that generates a control signal and a counter that counts a number of input data bits having improper data, as count results, from the frame start point, according to the control signal and the initial value.

13. An apparatus for checking a loss of frame, comprising:
   a first circuit that detects a frame alignment signal in a framed data of a digital hierarchy signal, the first circuit including a detector that checks first constant bits inputted on a frame start pulse location of the framed data, and generates a releasing enable signal based on the first constant bits; and
   a second circuit that checks whether the framed data is normal, and provides a releasing state according to a checking result, wherein the framed data is reframed data, wherein the second circuit includes a release circuit that, according to the releasing enable signal, counts the number of the first constant bits as the frame count result of a releasing state, and outputs a releasing signal when the first constant bits of the reframed data are the same as the first constant bits of the frame alignment signal, and are continuously inputted over the predetermined number of frames.

14. The apparatus of claim 13, wherein the releasing signal maintains a first releasing value when the first constant bits are inputted abnormally over the predetermined number of frames on the frame start pulse location of the framed data; and
   the releasing signal maintains a second frame releasing value when the first constant bits are inputted normally over the predetermined number of frames.

15. The apparatus of claim 13, further comprising a third circuit that outputs a state indication signal.

16. An apparatus for checking a loss of frame, comprising:
   a first circuit that detects a frame alignment signal in a framed data of a digital hierarchy signal, the first circuit including a detector that checks first constant bits inputted on a frame start pulse location of the framed data, and generates a declaring enable signal based on the first constant bits; and
   a second circuit that checks whether the framed data is normal, and provides a releasing state according to a checking result, wherein the framed data is reframed data, wherein the second circuit includes a declaration circuit that, according to the declaring enable signal, counts a number of the first constant bits as a frame count result of a declaring state, and outputs a declaring signal when the first constant bits of the reframed data are different than the first constant bits of the frame alignment signal and are continuously inputted over a predetermined number of frames.

17. The apparatus of claim 16, wherein the second circuit further includes a release circuit that, according to a releasing enable signal, counts the number of the first constant bits as the frame count result of a releasing state, and outputs a releasing signal when the first constant bits of the reframed data are the same as the first constant bits of the frame alignment signal, and are continuously inputted over the predetermined number of frames.

18. The apparatus of claim 17, further comprising:
   a determination circuit that receives the declaring signal and the releasing signal from the declaration circuit and the release circuit, respectively, and outputs a state signal that indicates a last state of the framed data.

19. The apparatus of claim 17, wherein the declaration circuit includes:
   a sub-frame counter that measures a sub-frame length of a circuit frame according to a designated clock signal;
   a frame start pulse generator that counts a number of the sub-frames based on the sub-frame length, and provides a frame start pulse signal to the detector at every frame based on the sub-frame length and the number of sub-frames;

a first counter that receives the framed data, the frame count result of the releasing state and the releasing signal from the release circuit, the declaring enable signal from the detector, the sub-frame length and the number of sub-frames, and checks whether the frame count result of the releasing state is continuously inputted over the predetermined number of frames on the frame start pulse location of the framed data; and a first output circuit that generates and outputs the declaring signal according to the frame count result of the declaring state.

20. The apparatus of claim 17, wherein the release circuit includes:

a second counter circuit that receives the reframed data, the releasing enable signal from the detector, the frame count result of the declaring state, and the declaring signal from the declaration circuit, and checks whether the frame count result of the declaring state is continuously inputted over the predetermined number of frames on the frame start pulse location of the framed data, and a second output circuit for outputting a releasing signal according to the count result of the releasing state.

21. The apparatus of claim 16, wherein the declaring signal maintains a first declaring value when the first constant bits are inputted abnormally over the predetermined number of frames on the frame start pulse location of the framed data; and the declaring signal maintains a second declaring value when the first constant bits are inputted normally over the predetermined number of frames.

22. An integrated circuit for a digital communication, comprising:

a reframer, including:
　a first circuit that detects a frame start point of input data based on a frame alignment signal defined in a framed data of a digital hierarchy signal, and
　a second circuit that excludes the input data having an improper start point based on a framed start point detecting value, and that outputs reframed data having the frame alignment signal; and
a loss of frame checking apparatus coupled to the reframer, wherein the loss of frame checking apparatus includes:
　a third circuit that detects the frame alignment signal in the reframed data, and
　a fourth circuit that checks whether the reframed data has a normal frame format, and provides a releasing state according to the checking result.

23. The integrated circuit of claim 22, wherein the third circuit includes a detector that checks first constant bits inputted on a frame start pulse location of the framed data, and generates one of a releasing enable signal or a declaring enable signal based on the first constant bits; and the fourth circuit includes:
　a declaration circuit that, according to the declaring enable signal, counts a number of the first constant bits as a frame count result of a declaring state, and outputs a declaring signal when the first constant bits of the reframed data are different than when first constant buts of the frame alignment signal, and are continuously inputted continuously over constant frames;
　a release circuit that, according to the releasing enable signal, counts the number of the first constant bits as the frame count result of a releasing state, and outputs a releasing signal when the first constant bits of reframed data are the same as the first constant bits of the frame alignment signal, and are continuously inputted over the predetermined number of frames; and
　a determination circuit that receives the declaring signal and the releasing signal from the declaration circuit and the release circuit, respectively, and outputs a state signal that indicates a last state of the framed data.

24. The integrated circuit of claim 22, further comprising:

a serial to parallel converter that converts serial data to parallel data;

an input selector that selectively transfers one of the parallel data and an input channel data as the input data;

a parallel to serial converter that converts the reframed data into parallel formats a serial data; and an output selector that selectively outputs one of the converted serial data and the reframed data.

25. The integrated circuit of claim 22, wherein the first circuit includes: an input selecting circuit that shifts the input data, map respective bits of the shifted input data, and selects a plurality of checking patterns on a bit basis according to the shifted input data;

a frame start point detecting circuit that receives the checking patterns outputted from the input selecting circuit, and that detects the frame start point which designates a start location of the frame alignment signal as a frame start point detecting value;

an initial value setting circuit that sets an initial value for counting improper input data based on the frame start point detecting value, and that generates a control signal; and a counter that counts a number of input data bits having improper data, as count results, from the frame start point, according to the control signal and the initial value.

26. The integrated circuit of claim 25, wherein the input selecting circuit includes:

a first shifter that shifts the input data into a first format and that sequentially outputs the first format shifted input data in parallel to the second circuit;

a second shifter that also receives the input data having the digital hierarchy structure, shifts the input data into a second format different from the first format according to a designated clock signal, and outputs the second format shifted input data in parallel;

a bit grouping circuit that maps the second format shifted input data to form the plurality of checking patterns according to a designated rule, and outputs groups of the checking patterns; and a checking pattern selecting output circuit that selectively outputs the plurality of checking patterns outputted from the bit grouping circuit at successive checking periods.

27. The integrated circuit of claim 25, wherein the input selecting circuit maps portions of the shifted input data from an upper bit, and forms a plurality of checking patterns, each checking pattern having the same length as the frame alignment signal.

28. The integrated circuit of claim 25, wherein the frame start point detecting circuit repeatedly performs a start point detecting operation until a predetermined frame alignment signal is detected, and determines the frame start point detecting value according to an input data bit order, to indicate a frame alignment signal start bit.

29. The integrated circuit of claim 25, wherein the second circuit includes a frame alignment circuit that aligns the shifted input data according to the frame start point detecting value and the count result, and that outputs the aligned shifted input data as reframed data.

30. An integrated circuit for digital communication, comprising a plurality of reframers on a signal chip, wherein each reframer comprises:

a first circuit that detects a frame start point of input data based on a frame alignment signal defined in a framed data of a digital hierarchy signal, the first circuit designating a start location of the frame alignment signal as a frame start point detecting value; and a second circuit that excludes the input data having an improper start point based on the frame start point detecting value, and that outputs reframed data having a normal frame format, wherein the first circuit comprises:

an initial value setting circuit that sets an initial value for counting improper input data based on the frame start point detecting value, and that generates a control signal; and a counter that counts a number of input data bits having improper data, as count results, from the frame start point, according to the control signal and the initial value.

31. The integrated circuit of claim 30, wherein each first circuit includes:

an input selecting circuit that shifts the input data, maps respective bits of the shifted input data, and selects a plurality of checking patterns on a bit by bit basis according to the shifted input data;

a frame start point detecting circuit that receives the checking patterns outputted from the input selecting circuit, and that detects the frame start point which designates the start location of the frame alignment signal as the frame start point detecting value;

an initial value setting circuit that sets an initial value for counting improper input data based on the frame start point detecting value, and that generates a control signal; and a counter that counts a number of input data bits having improper data, as count results, from the frame start point, according to the control signal and the initial value.

32. The integrated circuit of claim 30, wherein the first circuit comprises:

an input selecting circuit that shifts the input data, maps respective bits of the shifted input data, and selects a plurality of checking patterns on a bit by bit basis according to the shifted input data; and a frame start point detecting circuit that receives the checking patterns outputted from the input selecting circuit, and that detects the frame start point which designates a start location of the frame alignment signal as the frame start point detecting value.

* * * * *